US012769471B2

(12) United States Patent
Resch et al.

(10) Patent No.: US 12,769,471 B2
(45) Date of Patent: Oct. 20, 2026

(54) ACCESS CONTROL LISTS FOR A STORAGE NETWORK

(71) Applicant: Pure Storage, Inc., Santa Clara, CA (US)

(72) Inventors: Jason K. Resch, Warwick, RI (US); Wesley B. Leggette, Chicago, IL (US); Sebastien Vas, Sunnyvale, CA (US)

(73) Assignee: Everpure, Inc., Santa Clara, CA (US)

( * ) Notice: Subject to any disclaimer, the term of this patent is extended or adjusted under 35 U.S.C. 154(b) by 34 days.

(21) Appl. No.: 18/942,201

(22) Filed: Nov. 8, 2024

(65) Prior Publication Data

US 2025/0068348 A1 Feb. 27, 2025

Related U.S. Application Data

(63) Continuation of application No. 17/661,804, filed on May 3, 2022, now Pat. No. 12,141,459, which is a (Continued)

(51) Int. Cl.
*G06F 3/06* (2006.01)
*H04L 9/40* (2022.01)

(52) U.S. Cl.
CPC .......... *G06F 3/0644* (2013.01); *G06F 3/0611* (2013.01); *G06F 3/0631* (2013.01); (Continued)

(58) Field of Classification Search
CPC .... G06F 3/0644; G06F 3/0611; G06F 3/0631; G06F 3/0659; G06F 3/067; H04L 63/101
See application file for complete search history.

(56) References Cited

U.S. PATENT DOCUMENTS 4,092,732 A 5/1978 Ouchi
5,454,101 A 9/1995 Mackay
(Continued)

OTHER PUBLICATIONS

Swift, Michael M., et al. "Improving the granularity of access control for windows 2000." ACM Transactions on Information and System Security (TISSEC) 5.4 (2002): 398-437. (Year: 2002).*
(Continued)

*Primary Examiner* — Nicholas J Simonetti
(74) *Attorney, Agent, or Firm* — Katz Ruby & Carle LLP; Bruce E. Stuckman

(57) ABSTRACT

Methods and apparatus for storage pool tiering in a storage network. In an embodiment, a method executed by one or more processing modules of a storage network includes maintaining a storage network access control list (ACL) registry. The ACL registry includes a storage network sub-registry and one or more vault sub-registries, and each of the sub-registries includes one or more ACLs. The method further includes receiving a storage network access request from a requesting entity, identifying a request type of the storage network access request, and identifying the one or more ACLs of a sub-registry associated with the request type. The method continues with retrieving the one or more ACLs, identifying an ACL of the one or more ACLs based on an identifier associated with the requesting entity, and comparing the storage network access request to permissions of the identified ACL to determine whether the access request is authorized.

20 Claims, 17 Drawing Sheets

Related U.S. Application Data continuation-in-part of application No. 15/819,810, filed on Nov. 21, 2017, now Pat. No. 11,327,674, which is a continuation-in-part of application No. 13/869,655, filed on Apr. 24, 2013, now Pat. No. 10,178,083.

(60) Provisional application No. 61/655,736, filed on Jun. 5, 2012.

(52) U.S. Cl.
CPC ............ *G06F 3/0659* (2013.01); *G06F 3/067* (2013.01); *H04L 63/101* (2013.01)

(56) References Cited

U.S. PATENT DOCUMENTS

| | | | | |
|---|---|---|---|---|
| 5,485,474 | A | 1/1996 | Rabin | |
| 5,584,008 | A | 12/1996 | Shimada | |
| 5,701,458 | A * | 12/1997 | Bsaibes | H04L 63/101 707/999.009 |
| 5,774,643 | A | 6/1998 | Lubbers | |
| 5,802,364 | A | 9/1998 | Senator | |
| 5,809,285 | A | 9/1998 | Hilland | |
| 5,890,156 | A | 3/1999 | Rekieta | |
| 5,987,622 | A | 11/1999 | Lo Verso | |
| 5,991,414 | A | 11/1999 | Garay | |
| 6,012,159 | A | 1/2000 | Fischer | |
| 6,058,454 | A | 5/2000 | Gerlach | |
| 6,128,277 | A | 10/2000 | Bruck | |
| 6,175,571 | B1 | 1/2001 | Haddock | |
| 6,192,472 | B1 | 2/2001 | Garay | |
| 6,256,688 | B1 | 7/2001 | Suetaka | |
| 6,272,658 | B1 | 8/2001 | Steele | |
| 6,301,604 | B1 | 10/2001 | Nojima | |
| 6,356,949 | B1 | 3/2002 | Katsandres | |
| 6,366,995 | B1 | 4/2002 | Nikolaevich | |
| 6,374,336 | B1 | 4/2002 | Peters | |
| 6,415,373 | B1 | 7/2002 | Peters | |
| 6,418,539 | B1 | 7/2002 | Walker | |
| 6,449,688 | B1 | 9/2002 | Peters | |
| 6,567,948 | B2 | 5/2003 | Steele | |
| 6,571,282 | B1 | 5/2003 | Bowman-Amuah | |
| 6,609,223 | B1 | 8/2003 | Wolfgang | |
| 6,718,361 | B1 | 4/2004 | Basani | |
| 6,754,829 | B1 * | 6/2004 | Butt | G06F 21/33 726/8 |
| 6,760,808 | B2 | 7/2004 | Peters | |
| 6,785,768 | B2 | 8/2004 | Peters | |
| 6,785,783 | B2 | 8/2004 | Buckland | |
| 6,826,711 | B2 | 11/2004 | Moulton | |
| 6,879,596 | B1 | 4/2005 | Dooply | |
| 6,898,667 | B2 | 5/2005 | Umberger | |
| 6,978,366 | B1 | 12/2005 | Ignatchenko | |
| 7,003,688 | B1 | 2/2006 | Pittelkow | |
| 7,024,451 | B2 | 4/2006 | Jorgenson | |
| 7,024,609 | B2 | 4/2006 | Wolfgang | |
| 7,080,101 | B1 | 7/2006 | Watson | |
| 7,103,824 | B2 | 9/2006 | Halford | |
| 7,103,915 | B2 | 9/2006 | Redlich | |
| 7,111,115 | B2 | 9/2006 | Peters | |
| 7,140,044 | B2 | 11/2006 | Redlich | |
| 7,146,644 | B2 | 12/2006 | Redlich | |
| 7,171,493 | B2 | 1/2007 | Shu | |
| 7,222,133 | B1 | 5/2007 | Raipurkar | |
| 7,225,263 | B1 | 5/2007 | Clymer | |
| 7,240,236 | B2 | 7/2007 | Cutts | |
| 7,272,613 | B2 | 9/2007 | Sim | |
| 7,418,649 | B2 | 8/2008 | Li | |
| 7,457,835 | B2 | 11/2008 | Toebes | |
| 7,533,133 | B1 | 5/2009 | Lanzatella | |
| 7,581,156 | B2 | 8/2009 | Manasse | |
| 7,607,063 | B2 | 10/2009 | Kikuchi | |
| 7,636,724 | B2 | 12/2009 | de la Torre | |
| 7,680,822 | B1 | 3/2010 | Vyas | |
| 7,743,275 | B1 | 6/2010 | Tormasov | |
| 7,831,793 | B2 | 11/2010 | Chakravarty | |
| 7,865,673 | B2 | 1/2011 | Moore | |
| 7,925,666 | B1 | 4/2011 | Johnson | |
| 7,945,639 | B2 | 5/2011 | Gavrilov | |
| 8,051,362 | B2 | 11/2011 | Li | |
| 8,145,818 | B2 | 3/2012 | Murayama | |
| 8,214,590 | B2 | 7/2012 | Ulrich | |
| 8,281,404 | B2 | 10/2012 | Frey | |
| 8,335,904 | B1 | 12/2012 | Kitchen | |
| 8,386,840 | B2 | 2/2013 | Stougie | |
| 8,406,421 | B2 | 3/2013 | Kaymen | |
| 8,429,514 | B1 | 4/2013 | Goel | |
| 8,433,849 | B2 | 4/2013 | De Schrijver | |
| 8,620,879 | B2 | 12/2013 | Cairns | |
| 8,694,467 | B2 | 4/2014 | Sun | |
| 8,713,405 | B2 | 4/2014 | Healey | |
| 8,856,530 | B2 | 10/2014 | Patti | |
| 8,862,837 | B1 | 10/2014 | Marshak | |
| 8,868,508 | B2 | 10/2014 | Drobychev | |
| 8,914,632 | B1 | 12/2014 | Shankar | |
| 8,918,478 | B2 | 12/2014 | Ozzie | |
| 8,935,493 | B1 | 1/2015 | Dolan | |
| 8,972,694 | B1 | 3/2015 | Dolan | |
| 9,098,519 | B2 | 8/2015 | Pavlov | |
| 9,235,350 | B2 | 1/2016 | Mark | |
| 9,285,991 | B2 | 3/2016 | Alatorre | |
| 9,305,069 | B2 | 4/2016 | Zunger | |
| 9,372,809 | B2 | 6/2016 | Testardi | |
| 9,429,346 | B2 | 8/2016 | Harms | |
| 9,513,814 | B1 | 12/2016 | Can | |
| 9,792,295 | B1 | 10/2017 | Rus | |
| 9,811,262 | B1 | 11/2017 | Rus | |
| 9,823,840 | B1 | 11/2017 | Brooker | |
| 10,082,959 | B1 | 9/2018 | Chen | |
| 2002/0062422 | A1 | 5/2002 | Butterworth | |
| 2002/0166079 | A1 | 11/2002 | Ulrich | |
| 2003/0018927 | A1 | 1/2003 | Gadir | |
| 2003/0037261 | A1 | 2/2003 | Meffert | |
| 2003/0065617 | A1 | 4/2003 | Watkins | |
| 2003/0084020 | A1 | 5/2003 | Shu | |
| 2004/0024963 | A1 | 2/2004 | Talagala | |
| 2004/0122917 | A1 | 6/2004 | Menon | |
| 2004/0215998 | A1 | 10/2004 | Buxton | |
| 2004/0228493 | A1 | 11/2004 | Ma | |
| 2005/0100022 | A1 | 5/2005 | Ramprashad | |
| 2005/0114594 | A1 | 5/2005 | Corbett | |
| 2005/0125593 | A1 | 6/2005 | Karpoff | |
| 2005/0131993 | A1 | 6/2005 | Fatula | |
| 2005/0132070 | A1 | 6/2005 | Redlich | |
| 2005/0144382 | A1 | 6/2005 | Schmisseur | |
| 2005/0160329 | A1 | 7/2005 | Briggs | |
| 2005/0210270 | A1 | 9/2005 | Rohatgi | |
| 2005/0229069 | A1 | 10/2005 | Hassner | |
| 2006/0041719 | A1 | 2/2006 | Chui | |
| 2006/0047907 | A1 | 3/2006 | Shiga | |
| 2006/0136448 | A1 | 6/2006 | Cialini | |
| 2006/0156059 | A1 | 7/2006 | Kitamura | |
| 2006/0224603 | A1 | 10/2006 | Correll | |
| 2007/0079081 | A1 | 4/2007 | Gladwin | |
| 2007/0079082 | A1 | 4/2007 | Gladwin | |
| 2007/0079083 | A1 | 4/2007 | Gladwin | |
| 2007/0088970 | A1 | 4/2007 | Buxton | |
| 2007/0113032 | A1 | 5/2007 | Kameyama | |
| 2007/0174192 | A1 | 7/2007 | Gladwin | |
| 2007/0214285 | A1 | 9/2007 | Au | |
| 2007/0234110 | A1 | 10/2007 | Soran | |
| 2007/0283167 | A1 | 12/2007 | Venters | |
| 2008/0235234 | A1 | 9/2008 | Beedubail | |
| 2009/0094251 | A1 | 4/2009 | Gladwin | |
| 2009/0094318 | A1 | 4/2009 | Gladwin | |
| 2010/0023524 | A1 | 1/2010 | Gladwin | |
| 2010/0218037 | A1 | 8/2010 | Swartz | |
| 2010/0299313 | A1 | 11/2010 | Orsini | |
| 2011/0029840 | A1 | 2/2011 | Ozzie | |
| 2011/0087948 | A1 | 4/2011 | Murakami | |
| 2011/0225202 | A1 | 9/2011 | Man | |
| 2011/0282830 | A1 | 11/2011 | Mallge | |
| 2012/0060072 | A1 | 3/2012 | Simitci | |

(56) References Cited

U.S. PATENT DOCUMENTS

| | | | | |
|---|---|---|---|---|
| 2012/0066259 | A1* | 3/2012 | Huber | H04W 48/16 707/E17.014 |
| 2012/0131683 | A1 | 5/2012 | Nassar | |
| 2012/0260040 | A1 | 10/2012 | Mallge | |
| 2012/0317355 | A1 | 12/2012 | Ishizaki | |
| 2013/0246470 | A1 | 9/2013 | Price | |
| 2014/0181400 | A1 | 6/2014 | Lin | |
| 2015/0074216 | A1 | 3/2015 | Park | |
| 2015/0355979 | A1 | 12/2015 | Volvovski | |
| 2016/0335030 | A1* | 11/2016 | Baptist | G06F 16/178 |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (ISCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

SN = slice name
EDS = encoded data slice

ACCESS CONTROL LISTS FOR A STORAGE NETWORK

CROSS-REFERENCE TO RELATED APPLICATIONS

The present U.S. Utility patent application claims priority pursuant to 35 U.S.C. § 120 as a continuation of U.S. Utility application Ser. No. 17/661,804, entitled "STORAGE POOL TIERING IN A STORAGE NETWORK," filed May 3, 2022, which is a continuation-in-part of U.S. Utility application Ser. No. 15/819,810, entitled "STORAGE VAULT TIERING AND DATA MIGRATION IN A DISTRIBUTED STORAGE NETWORK," filed Nov. 21, 2017, issued as U.S. Pat. No. 11,327,674 on May 10, 2022, which is a continuation-in-part of U.S. Utility application Ser. No. 13/869,655, entitled "UPDATING ACCESS CONTROL INFORMATION WITHIN A DISPERSED STORAGE UNIT," filed Apr. 24, 2013, issued as U.S. Pat. No. 10,178,083 on Jan. 8, 2019, which claims priority pursuant to 35 U.S.C. § 119(e) to U.S. Provisional Application No. 61/655,736, entitled "STORING DATA IN A LAYERED DISTRIBUTED STORAGE AND TASK NETWORK", filed Jun. 5, 2012, all of which are hereby incorporated herein by reference in their entirety and made part of the present U.S. Utility patent application for all purposes.

BACKGROUND

Technical Field

This invention relates generally to computer networks and more particularly to access control lists in a storage network.

Description of Related Art

Computing devices are known to communicate data, process data, and/or store data. Such computing devices range from wireless smart phones, laptops, tablets, personal computers (PC), workstations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks.

The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

DETAILED DESCRIPTION

Figure 1:
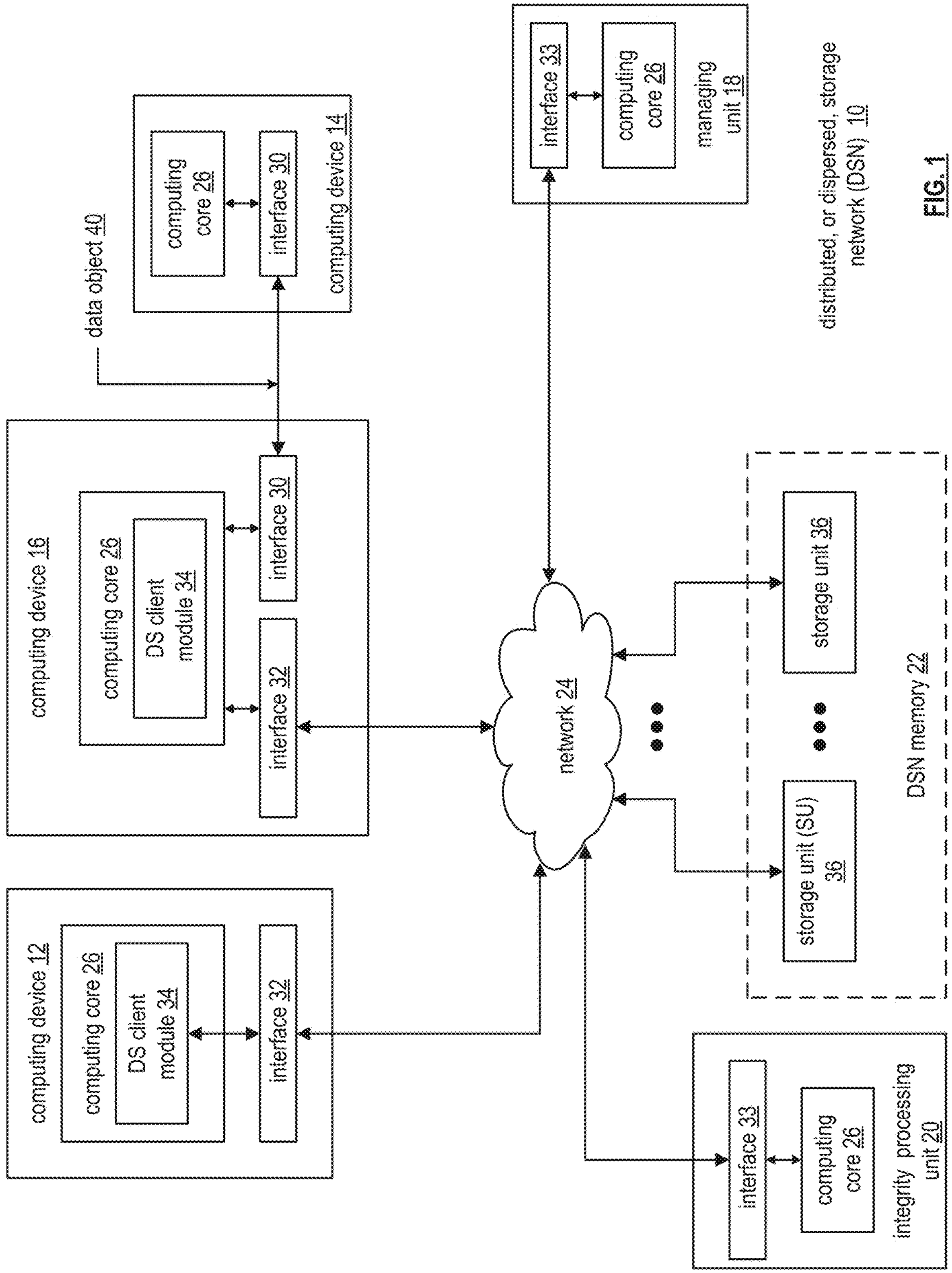
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
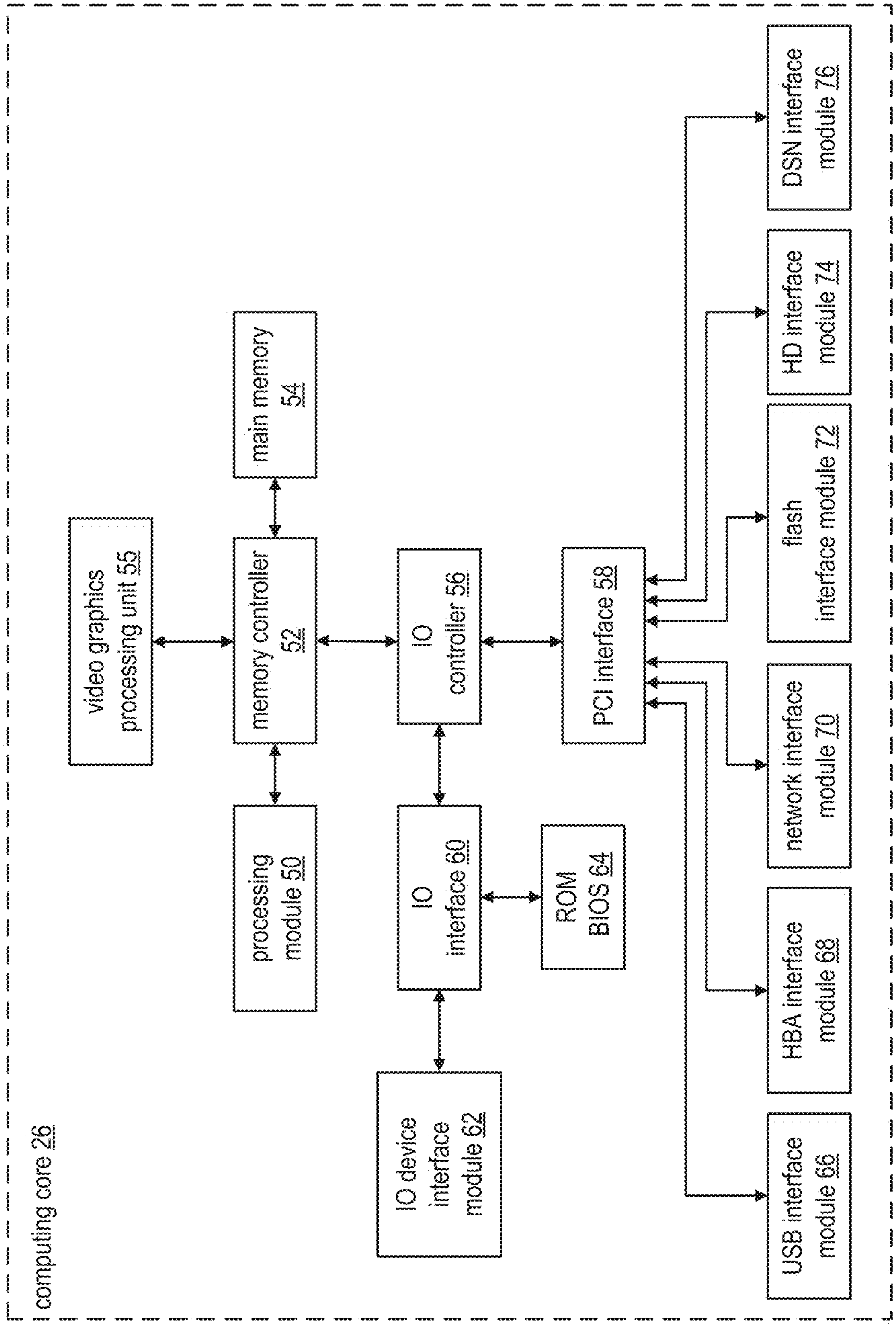
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more than or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of storage vault tiering, data migration, and dynamic resource selection for data access operations are discussed in greater detail with reference to FIGS. 9-16.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
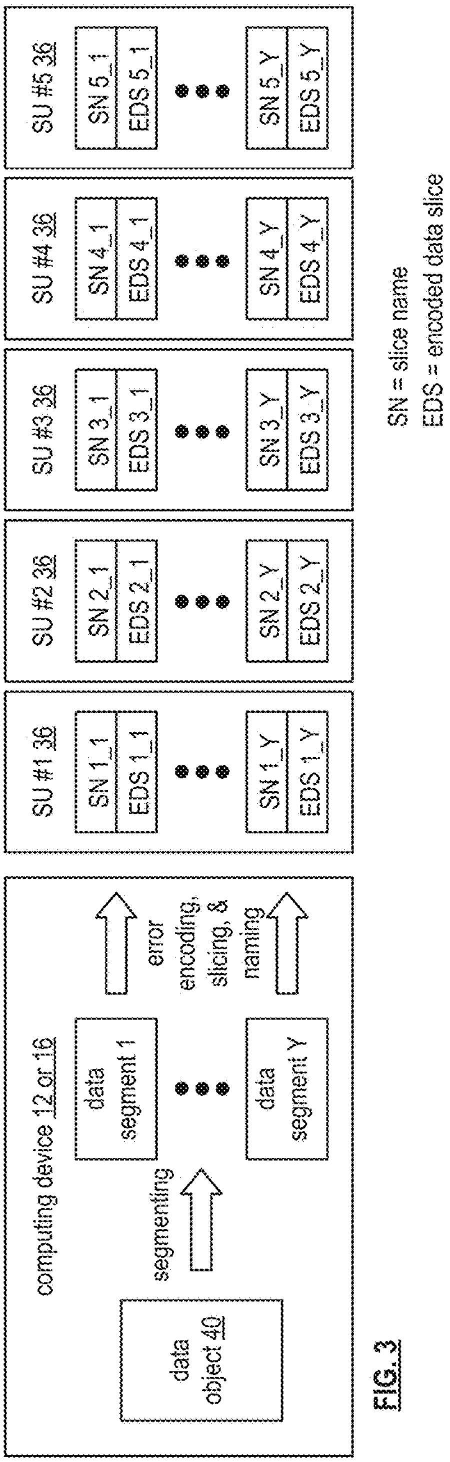
FIG. 3 is a schematic block diagram of an example of dispersed storage error encoding of data in accordance with the present disclosure.

FIG. 3 is a schematic block diagram of an example of dispersed storage error encoding of data. When a computing device 12 or 16 has data to store, it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 4:
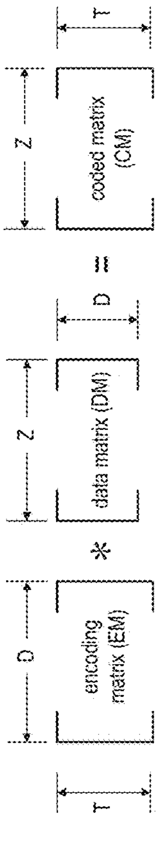
FIG. 4 is a schematic block diagram of a generic example of an error encoding function in accordance with the present disclosure.
Figure 5:
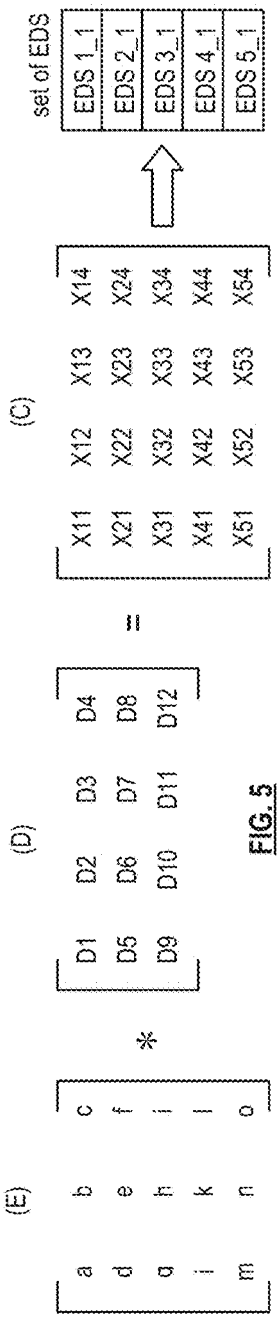
FIG. 5 is a schematic block diagram of a specific example of an error encoding function in accordance with the present disclosure.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Figure 6:
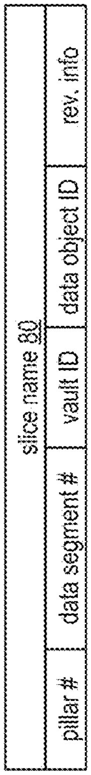
FIG. 6 is a schematic block diagram of an example of slice naming information for an encoded data slice (EDS) in accordance with the present disclosure.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
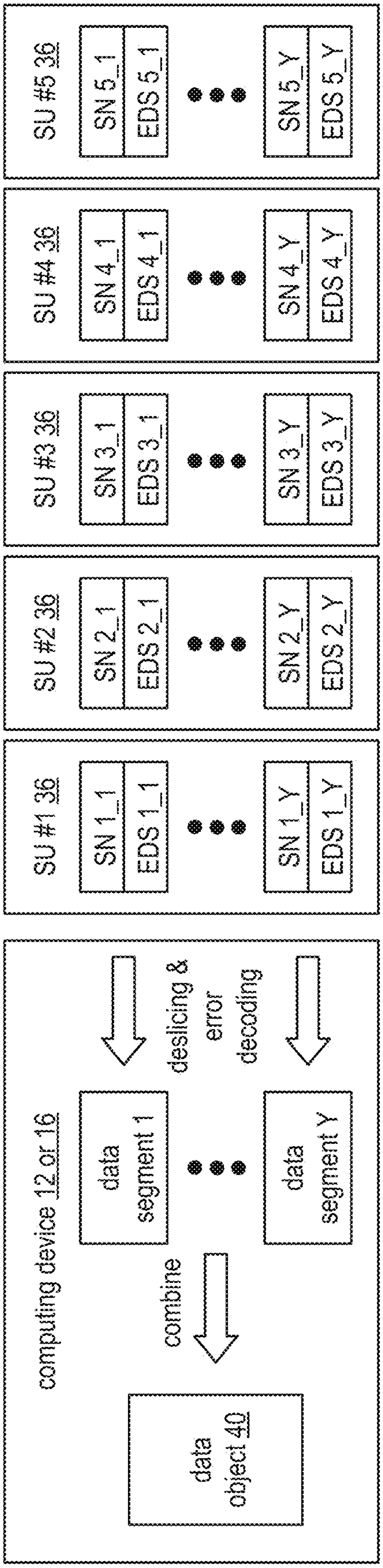
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
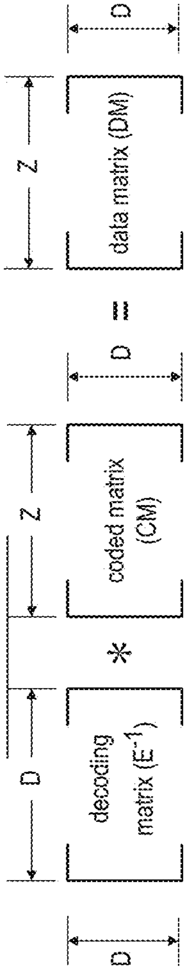
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In a dispersed storage network, it is natural for some stored data to be of greater importance and/or have different storage requirements than other stored data. Often, the relative importance of a given piece of data is a dynamic property that evolves over time. Likewise, the performance and reliability of storage units and sets of storage units may vary. Some storage sets may be of relatively high performance, while others may be more suitable for long-term reliable storage. Knowing the relative importance, size, frequency of access, etc. of data may be useful when determining appropriate resources for storing the data. As described more fully below in conjunction with the novel examples of FIGS. 9-16, differentiated levels of service within a DSN memory are enabled using rules and methods for data storage and migration based on, for example, delivered performance levels associated with storage tiers and a required performance level associated with the data.

Figure 9:
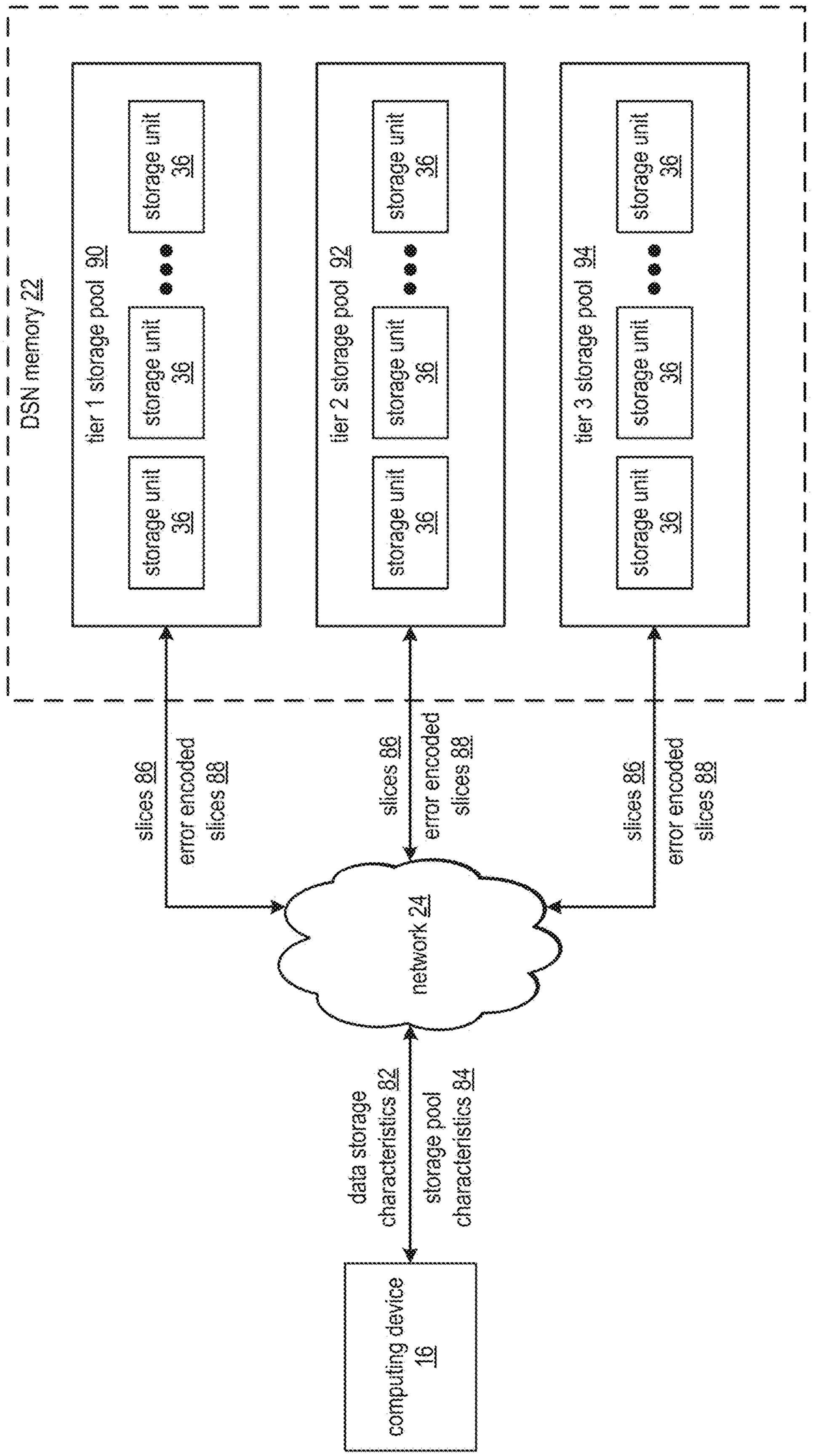
FIG. 9 is a schematic block diagram of an example of a DSN performing data migration in accordance with the present disclosure.

FIG. 9 is a schematic block diagram of an example of a distributed storage network (DSN) performing data migration in accordance the present disclosure. The illustrated DSN includes a computing device 16, DSN memory 22, and the network 24 of FIG. 1. The illustrated DSN memory 22 includes a plurality of sets of storage units 36 (where, for example, 1-n storage units is in a set and n is an integer greater than or equal to three) arranged as storage pools as described more fully below. Each storage unit 36 may be implemented utilizing the storage unit 36 of FIG. 1, and each of the storage units 36 includes a DS client module 34/processing module and memory (not separately illustrated). The storage units 36 of a storage set may be located at a same physical location (site) or located at multiple physical locations without departing from the technology as described herein.

In general, DSN memory 22 stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

Referring more particularly to FIG. 9, the DSN memory 22 of the illustrated embodiment includes a plurality of tiered storage pools 90, 92, and 94 (e.g., tiers 1-3). Each storage pool of the plurality of tiered storage pools 90-94 includes a set of storage units 36 utilized to access at least one of data slices 86 and error coded data slices 88. Each storage pool of the plurality of tiered storage pools 90-94 is operably coupled via the network 24 to the plurality of tiered storage pools 90-94 to facilitate migrating data slices 86 and/or error coded data slices 88 (e.g., "slices"). Migration of slices may enable a more favorable match of a data storage performance level requirement and a target/actual storage performance level when at least one storage pool of the plurality of tiered storage pools 90-94 is associated with an actual storage performance level that is different than an actual storage performance level associated with at least one other storage pool. As described more fully below, computing device 16 utilizes data storage characteristics 82 and storage pool characteristics 84 relating to data stored in a storage tier.

In various examples, each storage pool may be associated with an actual performance level (also referred to as a "delivered performance level"), where the actual performance level includes one or more of an access latency level, an access bandwidth level, a cost level, a storage capacity level, a geographic affiliation, a security level, an availability level, etc. For example, the tier 1 storage pool 90 may be associated with an "active" storage tier requiring a target performance level that includes a relatively low access latency performance level and an average reliability level. As another example, the tier 3 storage pool 94 may be associated with an "inactive" (e.g., archival) storage tier requiring a target performance level that includes allowing a highest access latency performance level and mandating a highest reliability level. As yet another example, the tier 2 storage pool 92 may be associated with a "near line" storage tier requiring a target performance level including an average access latency performance level and an average reliability level.

From time to time, a determination may be made (e.g., by one or more of the storage unit 36, a computing device 16, a managing unit 18, etc.) whether to move slices from a first storage pool to a second storage pool to achieve a better match of required performance and delivered performance when a change is detected in required performance. For example, a determination is made to move slices from a storage pool associated with an active tier level of performance to a storage pool associated with a near line tier level of performance when a frequency of access of the slices falls below an active access threshold level. Detecting a change in required performance may be based on one or more of a storage pool utilization level (e.g., move data slices from a nearly full storage pool to a relatively underutilized storage pool), a number of slice accesses per unit of time (e.g., access frequency level), a timestamp associated with a last data slice access, a revised slice access quality of service goal, an estimated cost of moving slices, an actual quality of service level, etc. Detecting a change in required performance may include one or more of initiating a query, performing a performance test, monitoring historical performance information, detecting data access activity, and receiving a request.

It is noted that two or more of the plurality of tiered storage pools 90-94 may be part a common vault (e.g., a virtual memory block associated with a portion of an overall namespace of the DSN) within the DSN memory 22. Further, a given storage pool may consist of storage units which are relatively new, offer better performance or reliability, utilize speed-optimized communication links, etc. Additionally, one or more vaults or storage pools may be arranged or combined in various ways to provide different storage tiers (including storage tiers using differing dispersed storage error coding function parameters), with associated migration policies that guide movement of data between various storage tiers.

Figure 10:
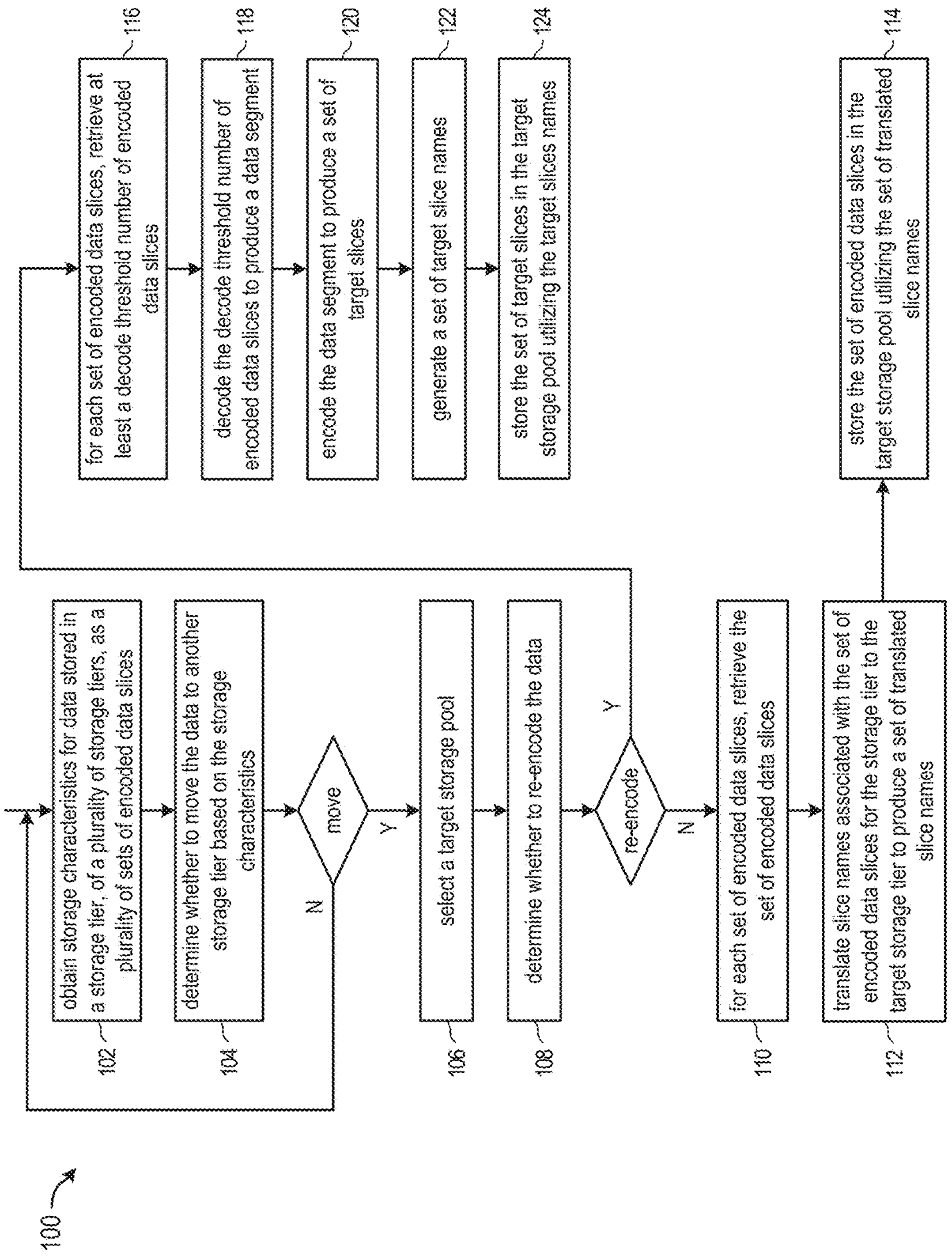
FIG. 10 is a flow diagram illustrating an example of migrating data slices in accordance with the present disclosure.

FIG. 10 is a flow diagram 100 illustrating an example of migrating data slices in accordance with the present disclosure. The method begins at step 102 where one or more processing modules of one or more computing devices (e.g., of a DS client module 34 of a computing device 16 or storage unit 36) obtains storage characteristics for data stored in a first pool of storage units associated with a first storage tier of a plurality of storage tiers as a plurality of sets of encoded data slices (e.g., slices and/or error coded data slices). The storage characteristics includes one or more of a present storage tier utilized to store the data, a delivered performance level associated with the present storage tier, and a required performance level associated with the data. Obtaining the storage characteristics includes one or more of a lookup, a query, a test, and detecting a change in the required performance level. The method continues at step 104 where the processing module determines whether to move the data to another storage pool, associated with another storage tier, based on the storage characteristics. Determining to move the data includes indicating to move the data when the delivered performance level associated with the present storage tier compares unfavorably to the required performance level associated with the data. The method loops back to step 102 when the processing module determines to not move the data. The method continues to step 106 when the processing module determines to move the data.

The method continues at step 106 where the processing module selects a target storage pool having a target storage tier. The selecting includes identifying a storage tier with an associated delivered performance level that more favorably matches the required performance level associated with the data. For example, the processing module identifies an "active" storage tier when the required performance level associated with the data better matches the active storage tier performance than a currently utilized storage tier. For instance, a change in required performance level may be detected when a higher access frequency is detected for the data, and a suitable active storage tier is available.

The method continues at step 108 where the processing module determines whether to re-encode the data. Determining whether to re-encode the data may be based on one or more of a storage capacity level of the target storage pool, a utilization level of the target storage pool, and a storage reliability requirement. For example, the processing module determines to re-encode the data when an above-average storage reliability requirement is detected. In another example, the processing module determines to re-encode the data when the dispersed storage error coding function parameters used to generate the encoded data slices differs from the parameters used to store data in the target storage pool (e.g., due to a differing number of storage units in the target storage pool). The method branches to step 116 when the processing module determines to re-encode the data. The method continues to step 110 when the processing module determines not to re-encode the data.

The method continues at step 110, where, for each set of encoded data slices, the processing module retrieves a set of encoded data slices (e.g., generates and sends a set of read slice requests to the storage tier). The method continues at step 112 where the processing module translates slice names associated with the set of encoded data slices from a present storage tier to the target storage tier to produce a set of translated slice names. Translating slice names may be based on one or more of dispersed storage error coding function parameters of the storage tier and dispersed storage error coding function parameters of the target storage tier. For example, the processing module changes a vault identifier (ID) to align the set of translated slice names with the target storage tier. The method continues at step 114 where the processing module facilitates storage (e.g., via write requests) of the set of encoded data slices in the target storage pool utilizing the set of translated slice names. In an example, facilitating storage of the data slices includes generating a set of write requests that includes the set of translated slice names and the set of encoded data slices and outputting the set of write requests to the target storage tier.

When the processing module determines to re-encode the data, the method continues at step 116, where, for each set of encoded data slices, the processing module retrieves at least a decode threshold number of encoded data slices. Retrieving the encoded data slices includes generating a set of read slice requests, outputting the set of read slice requests to the storage tier, and receiving at least the decode threshold number of encoded data slices in response. The method continues at step 118 where the processing module decodes the decode threshold number of encoded data slices to produce a data segment utilizing a first set of dispersed storage error coding function parameters associated with the storage tier.

The method continues at step 120 where the processing module encodes the data segment to produce a set of target data slices utilizing a second set of dispersed storage error coding function parameters associated with the target storage tier. The method continues at step 122 where the processing module generates a set of target slice names in accordance with the second set of dispersed storage error coding function parameters. Generating the set of target slice names can include, for example, utilizing a vault ID associated with the target storage tier and a slice index associated with a pillar width value of the vault. The method continues at step 124 where the processing module facilitates storage (e.g., via write requests) of the set of target data slices in the target storage pool utilizing the target slice names. Facilitating storage of the set of target data slices can include, for example, generating a set of write requests that includes the set of target slice names and a set of target data slices and outputting the set of write requests to the target storage tier.

Figure 11:
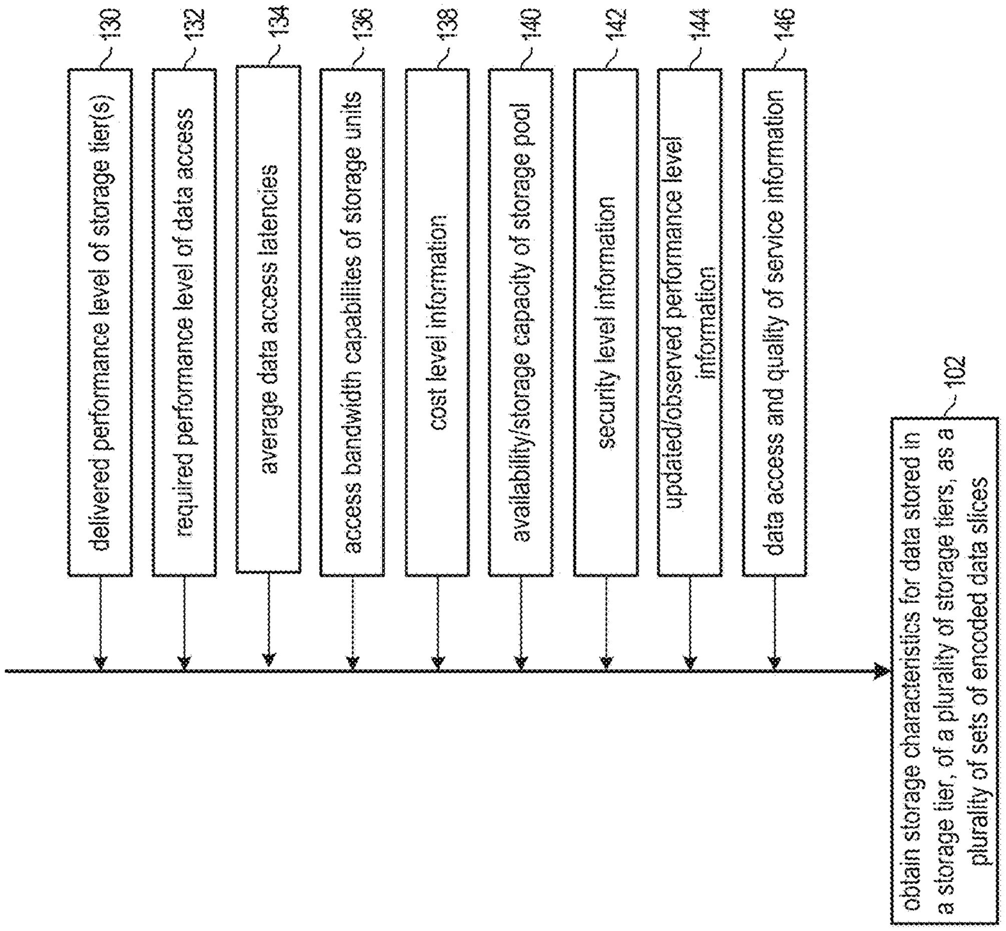
FIG. 11 is a flow diagram of obtaining storage characteristics relating to data stored in a tiered pool of storage units in accordance with the present disclosure.

FIG. 11 is a flow diagram of obtaining storage characteristics relating to data stored in a tiered pool of storage units in accordance with the present disclosure. In the illustrated example, a variety of storage characteristics for data stored in a storage tier is obtained (e.g., such as shown in step 102 of FIG. 10). Such storage characteristics can include: a delivered performance level of one or more storage tiers 130; a required performance level of data access 132; averaged data latency access information 134; access bandwidth capabilities of storage units of a storage pool 136; cost level information 138 relating to storage or migration of data; availability and storage capacity information for a storage pool 140; security level information 142; updated/observed performance level information 144; data access and quality of service information 146; etc. Other information, such as the identity of a data creator/requester and other meta-data associated with the data, may be determined. Such storage characteristics may be utilized by a computing device, for example, in determining whether to move data from one storage tier to another storage tier, selecting a target storage pool, determining whether to re-encode data, etc.

Figure 12:
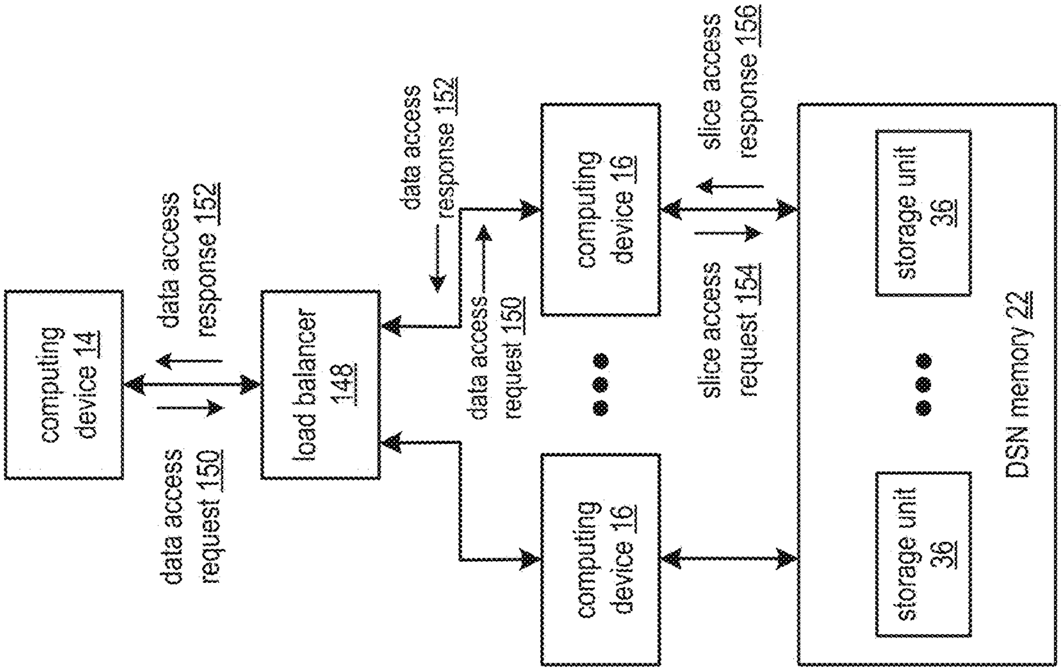
FIG. 12 is a schematic block diagram of an example of a DSN performing load balancing in accordance with the present disclosure.

FIG. 12 is a schematic block diagram of another embodiment of a distributed computing system that includes a computing device 14, a load balancer 148, a plurality of computing devices 16, and a DSN memory 22. Alternatively, one or more dispersed storage (DS) processing units may substitute for one or more computing devices 16. Further alternatively, a dispersed storage network (DSN) memory may substitute for the DSN memory 22. The computing device 14 is operable to generate and send a data access request 150 to the load balancer 148 to facilitate accessing data stored as a plurality of sets of encoded data slices in the DSN memory 22. The data access request 150 includes at least one of a data identifier (ID), data, a requesting entity ID (e.g., associated with the computing device 14), and a preferred computing device ID. The load balancer 148 is operable to receive the data access request 150, identify a computing device 16 of the plurality of computing devices 16 based on the data access request 150, and forward the data access request 150 to the identified computing device 16. Identifying a computing device includes identifying a computing device identifier (ID) of the computing device based on one or more of a requesting entity ID, a data ID, a computing device performance indicator, a cached data indicator, and affiliation information. The affiliation information includes a list of associations between one or more of the requesting entity ID, the data ID, and the computing device ID. For example, the list includes an association between a second computing device and a data ID of 457.

The computing device 16 is operable to receive the data access request 150 and process the request. Processing the request includes generating a data access response 152 when data affiliated with the data access request 150 is available in a cache memory of the computing device 16. The processing the request further includes generating a plurality of sets of slice access requests 154 and sending the plurality of sets of slice access requests 154 to the DSN memory 22 when the data affiliated with the data access request 150 is not available in the cache memory of the computing device 16. The DSN memory 22 is operable to receive the plurality of sets of slice access requests 154, access the plurality of sets of encoded data slices based on the plurality of sets of slice access requests 154, generate one or more slice access responses 156, and output the one or more slice access responses 156 to the computing device 16. The computing device 16 is further operable to receive the one or more slice access responses 156, further process the one or more slice access responses 156 to generate at least one of a response indicator and data, generate a data access response 152 that includes at least one of the response indicator and the data, and to send the data access response 152 to the user device 14. The sending of the data access response 152 includes outputting the data access response 152 directly to the user device 14 and sending the data access response 152 to the user device 14 via the load balancer 148.

The computing device 16 is further operable to modify the affiliation information based on one or more of a computing device performance level, a request, and a predetermination. For example, the computing device modifies the affiliation information to disassociate an unfavorably performing computing device from an affiliation (e.g., to a data ID) and to associate a more favorably performing computing device in the affiliation. The computing device 16 is further operable to update the cached data indicator based on a status of cached data within the computing device 16. The updating includes indicating that data is included when data is stored in the cache memory of the computing device 16 and indicating that data is excluded when the data is deleted from the cache memory. The indicating includes generating and sending the cached data indicator to at least one of the load balancer and at least one other computing device 16.

Figure 13:
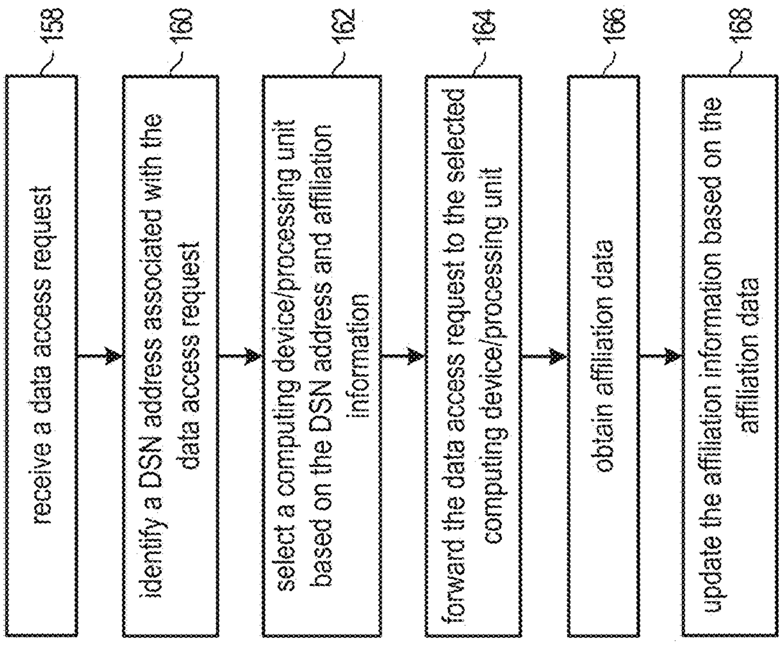
FIG. 13 is a flow diagram illustrating an example of load-balancing in accordance with the present disclosure.

FIG. 13 is a flow diagram illustrating an example of load-balancing. The method begins at step 158 where a processing module (e.g., of a dispersed storage (DS) client module of a load balancer) receives a data access request. The method continues at step 160 where the processing module identifies a distributed storage network (DSN) address associated with the data access request. Identifying the DSN address includes at least one of accessing a DSN directory, accessing a DSN index, and generating the DSN address based on the data ID. The DSN address includes at least one of a source name and a plurality of sets of slice names. The processing module may generate a null address when the data access request is to store new data.

The method continues at step 162 where the processing module selects a computing device (e.g., DSN processing unit) based on the DSN address and affiliation information. Selecting the computing device includes at least one of identifying a computing device affiliated with the DSN address when a DSN address is not null and assigning a computing device when the DSN address is null. For example, the processing module assigns a computing device 16 based on a requesting entity ID when the DSN address is null. As another example, the processing module selects computing device 16 when affiliation information indicates that computing device 16 is affiliated with a data address of the request.

The method continues at step 164 where the processing module forwards the data access request to the selected computing device. The method continues at step 166 where the processing module obtains affiliation data. Obtaining the affiliation data includes at least one of generating the affiliation data based on a pattern of requests and retrieving the affiliation data from one or more DSN system units. For example, the processing module generates the affiliation data to affiliate computing device 16 with data ID of 457 when a previous access request to data of data ID of 457 has favorably utilized a computing device 16. The method continues at step 168 where the processing module updates the affiliation information based on the affiliation data. Updating the affiliation information includes at least one of adding new affiliations for new data stored in cache memory for current requesting entities or current data stored in cache memory for new requesting entities and deleting old affiliations when data is deleted from a cache memory of a computing device.

Figure 14:
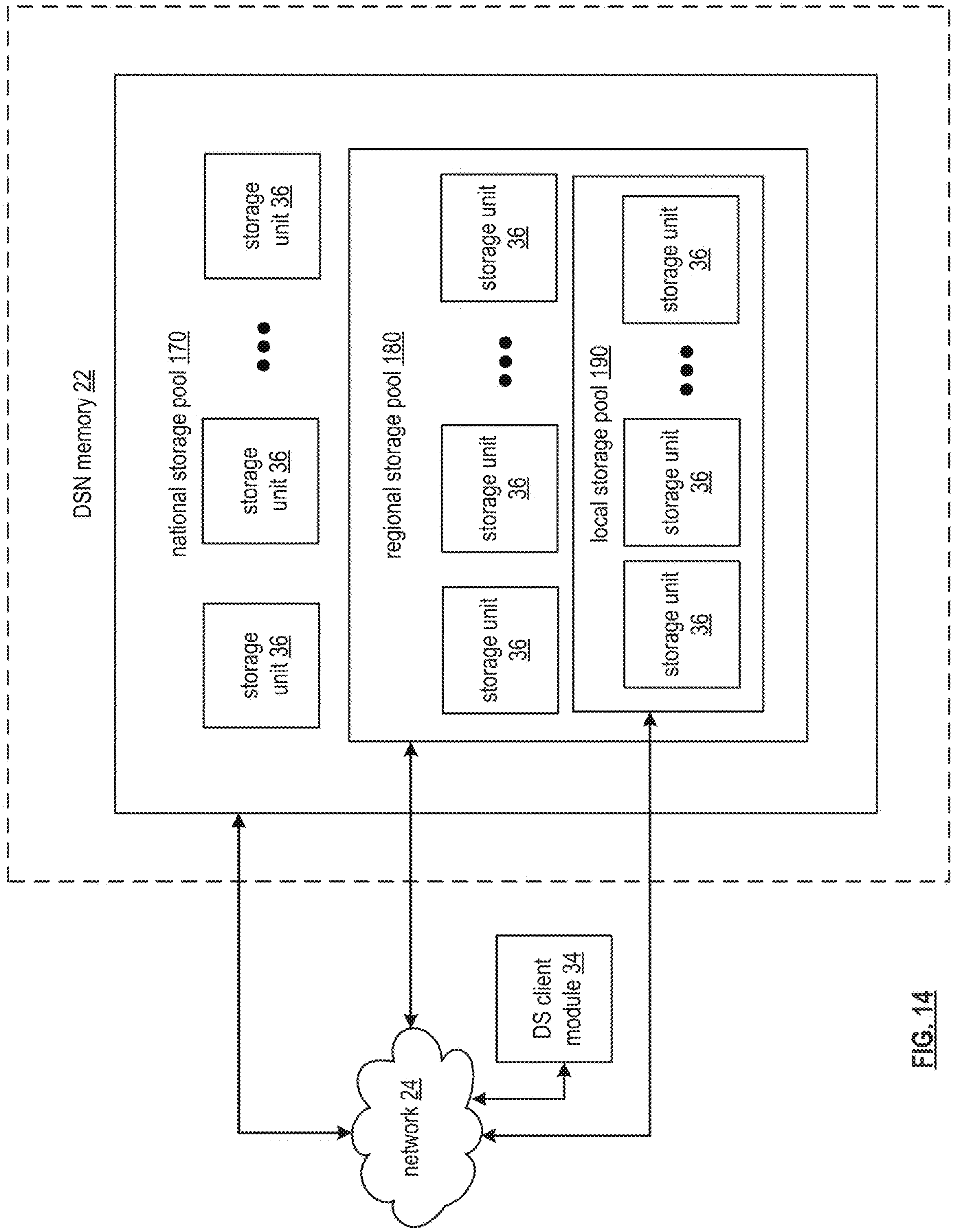
FIG. 14 is a schematic block diagram of an example of a DSN having tiered storage pools in accordance with the present disclosure.

FIG. 14 is a schematic block diagram of an example of a DSN having tiered storage pools. The system includes a network 24 and DSN memory 22 of FIG. 1. The DSN memory 22 of the illustrated example includes a plurality of concentric storage pools. For example, a national storage pool 170 includes a regional storage pool 180 and a local storage pool 190, and the regional storage pool includes the local storage pool. Each storage pool of the plurality of concentric storage pools includes a set of storage units 36 of FIG. 1. The set of storage units can include DS execution modules (not separately illustrated) utilized to access at least one of slices and error coded slices. Each storage pool of the plurality of concentric storage pools is operably coupled via the network 24 to the plurality of concentric storage pools to facilitate migrating data such as slices and/or error coded slices (e.g., "slices"). Migrating slices may enable a more favorable match of a slice storage performance requirement and an actual slice storage performance when at least one storage pool of the plurality of concentric storage pools is associated with an actual slice storage performance level that is different than an actual slice storage performance level associated with at least one other storage pool.

Each storage pool can be associated with a target slice storage performance level. The target slice storage performance level can include one or more of an access latency performance level, an access bandwidth level, a cost level, a storage capacity level, a geographic affiliation, a security level, and an availability level. For example, the local storage pool can be associated with active storage requiring a target slice performance level that includes a lowest access latency performance level and an average reliability level. As another example, the national storage pool 170 can be associated with inactive storage requiring a target slice performance level that includes allowing a highest access latency performance level and mandating a highest reliability level. As yet another example, the regional storage pool 180 can be associated with near line storage requiring a target slice performance level including an average access latency performance level and an average reliability level.

A set of slices can be accessed in at least one storage pool of the plurality of concentric storage pools. For example, a set of slices are generated and initially stored in the plurality of storage units of the local storage pool 190 such that frequent accessing of a set of slices may benefit from a storage performance level associated with the local storage pool 190. As time goes on a storage requirement may change. For example, a frequency of access requirement may lower as time goes on. As such, the set of slices can be transferred to a storage pool at their lines with a lowered frequency of access requirement. For example, the set of slices are transferred from the local storage pool 190 to the regional storage pool 180. As time further goes on, a similar process can repeat such that the set of slices are transferred from the regional storage pool 180 for the national storage pool 170. A similar process can be utilized in a reverse direction. For example, the set of slices can be transferred from the national storage pool to the regional storage pool when the frequency of access requirement increases. As time further goes on, the set of slices can be transferred from the regional storage pool to the local storage pool as the frequency of access requirement further increases.

Resources associated with a storage pool contained within another storage pool can be utilized for storage of slices with the storage pool. For example, any of the storage units of the local storage pool may be utilized in addition to storage units associated with the regional storage pool (e.g., and not the local storage pool) when storing a set of slices in the regional storage pool. Resources can be associated with multiple storage pools based on multiple associations. For example, a plurality of storage units associated with a first local storage pool can also be associated with a second local storage pool. As another example, a plurality of storage units associated with a regional storage pool and a second local storage pool may not be associated with the first local storage pool.

Figure 15:
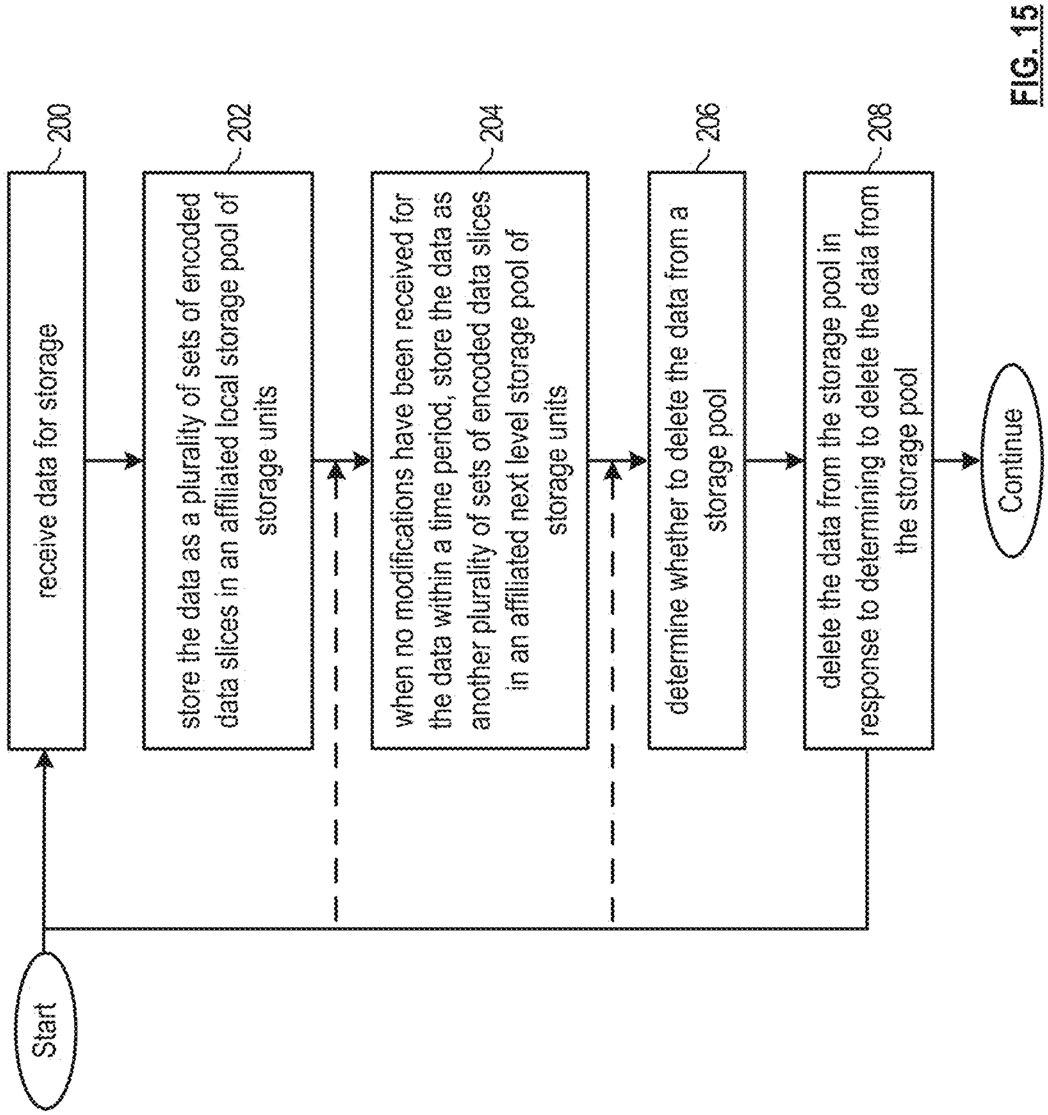
FIG. 15 is a flow diagram illustrating an example of writing data in accordance with the present disclosure.

FIG. 15 is a flow diagram illustrating an example of writing data. In particular, a method is presented for use in association with one or more functions and features described in conjunction with FIGS. 1-14, for execution by a dispersed storage (DS) client module 34 that includes a processor or via another processing system of a dispersed storage network that includes at least one processor and memory that stores instruction that configure the processor or processors to perform the steps described below.

The method begins at step 200, where a processing system (e.g., of a dispersed storage (DS) client module such as the DS client module 34 of FIG. 1) receives data for storage. Receiving data can include receiving one or more of the data, a data identifier (ID), and/or a requesting entity ID. The method continues at step 202, where the processing system stores the data as a plurality of sets of encoded data slices in an affiliated local storage pool of storage units. Storing the data can include encoding the data utilizing a dispersed storage error coding function and in accordance with dispersed storage error coding function parameters associated with the local storage pool to produce the plurality of sets of encoded data slices, generating a plurality of sets of slice names associated with the plurality of sets of encoded data slices, generating a plurality of sets of write slice requests that includes the plurality of sets of encoded data slices and the plurality of sets of slice names, identifying a set of storage units of the local storage pool, initializing a frequency of access indicator corresponding to the data ID (e.g., a timestamp, a number of accesses=1), and/or outputting the plurality of sets of write slice requests to the identified set of storage units where each storage unit of the identified set of storage units stores one or more encoded data slices of the plurality of sets of encoded data slices.

When no modifications have been received for the data within a time period, the method continues at step 204, where the processing system stores the data as another plurality of sets of encoded data slices in an affiliated next level storage pool of storage units. The processing system can indicate that no modifications have been received for the data within the time period when a real-time clock is greater than a timestamp of the frequency of access indicator corresponding to the data ID by a time period threshold. Storing the data can include at least one of generating and storing the other plurality of sets of encoded data slices and retrieving the plurality of sets of encoded data slices from the local storage pool and storing the plurality of sets of encoded data slices in the next level storage pool.

Generating and storing the other plurality of sets of encoded data slices can include obtaining the data, encoding the data utilizing the dispersed storage error coding function and in accordance with dispersed storage error coding function parameters of the next level storage pool to produce the other plurality of sets of encoded data slices, selecting a set of storage units of the next level storage pool, and/or outputting the other plurality of sets of encoded data slices to selected set of storage units of the next level storage pool. Obtaining the data can include retrieving the plurality of sets of encoded data slices from the local storage pool and/or decoding the plurality of sets of encoded data slices utilizing the dispersed storage error coding function and in accordance with the dispersed storage error coding parameters of the local storage pool to reproduce the data.

The method continues at step 206 where the processing system determines whether to delete the data from a storage pool. The determination can be based on one or more of a storage pool identifier associated with storage of the data, a storage pool level (e.g., never delete from the national storage pool when utilizing the national storage pool as a long-term reliable backup), a value of the frequency of access indicator, a current timestamp, a storage pool memory utilization level, a time threshold, a storage pool memory utilization threshold, and/or a cost of storage estimate. For example, the processing system can indicate to delete the data from the local storage pool when the frequency of access indicator indicates that a time period since a last data access is greater than a time threshold. The method can loop back to at least one of the steps where the processing system receives more data, determines whether any modifications have been received to move the data to another storage level, and/or determines whether to delete the data when the processing system determines not to delete the data from the storage pool. The method continues to step 208 when the processing system determines to delete the data from storage pool, which includes deleting the data from the storage pool. Deleting the data can include one or more of verifying that the data is currently stored in another higher-level storage pool and/or requesting deletion of the data from the storage pool when the data is verified to be stored in the other higher-level storage pool.

Figure 16:
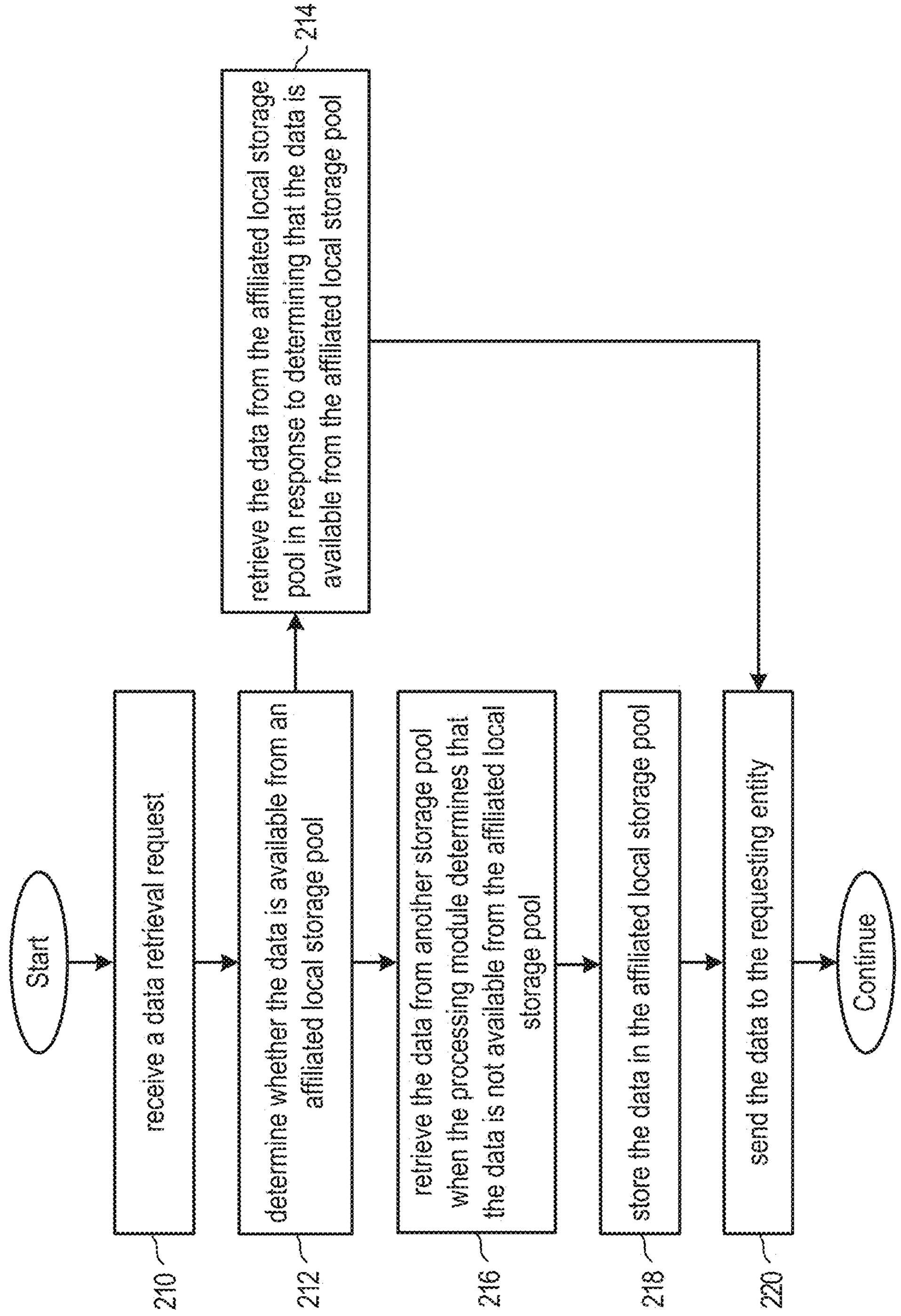
FIG. 16 is a flow diagram illustrating an example of reading data in accordance with the present disclosure.

FIG. 16 is a flow diagram illustrating an example of reading data. In particular, a method is presented for use in association with one or more functions and features described in conjunction with FIGS. 1-15, for execution by a dispersed storage (DS) client module 34 that includes a processor or via another processing system of a dispersed storage network that includes at least one processor and memory that stores instruction that configure the processor or processors to perform the steps described below. The dispersed storage (DS) client module 34 can perform some or all of the steps of FIG. 16 alternatively or in addition to some or all of the steps of FIG. 15. For example, step 210 of FIG. 16 can follow completion of step 208 of FIG. 15.

The method begins at step 210, where a processing system (e.g., of a dispersed storage (DS) client module such as DS client module 34) receives a data retrieval request. Receiving the data retrieval request can include receiving one or more of a requesting entity identifier (ID), a data ID, a mandatory storage pool ID, and a preferred storage pool ID. The method continues at step 212, where the processing system determines whether the data is available from an affiliated local storage pool. This determination can be based on at least one of outputting a read request, outputting a list request, outputting a list digest request, accessing a list, and/or receiving a response.

The method continues at step 214 when the processing system determines that the data is available from the affiliated local storage pool. Step 214 includes retrieving the data from the affiliated local storage pool. Retrieving can include generating a plurality of sets of read slice requests that include a plurality of sets of slice names associated with the data, outputting the plurality of sets of read slice requests to a set of storage units of the affiliated local storage pool, receiving a plurality of at least a decode threshold number of encoded data slices, and/or decoding the plurality of the at least the decode threshold number of encoded data slices to reproduce the data. The method branches to step 220, where the processing system sends the data to the requesting entity.

When the processing system determines that the data is not available from the affiliated local storage pool, after completing step 212, the method continues at step 216, where the processing system retrieves the data from another storage pool. Retrieving the data can include identifying the other storage pool, retrieving the plurality of sets of encoded data slices, and/or decoding the plurality of sets of encoded data slices to reproduce the data. Identifying the other storage pool can be based on at least one of accessing a data to storage pool identifier list, sending a read request, sending a list request, sending a list digest request, and/or receiving a response. For example, the processing system identifies a higher-level storage pool that includes the data, retrieves the slices, and/or decodes the slices to reproduce the data. The method continues at step 218, where the processing system stores the data in the affiliated local storage pool (e.g., since frequency of access has increased). Storing the data can include storing the plurality of sets of encoded data slices in the affiliated local storage pool and/or re-encoding the data to produce a second plurality of encoded data slices for storage in the affiliated local storage pool. The method continues at step 220, where the processing system sends the data to the requesting entity.

Figure 17:
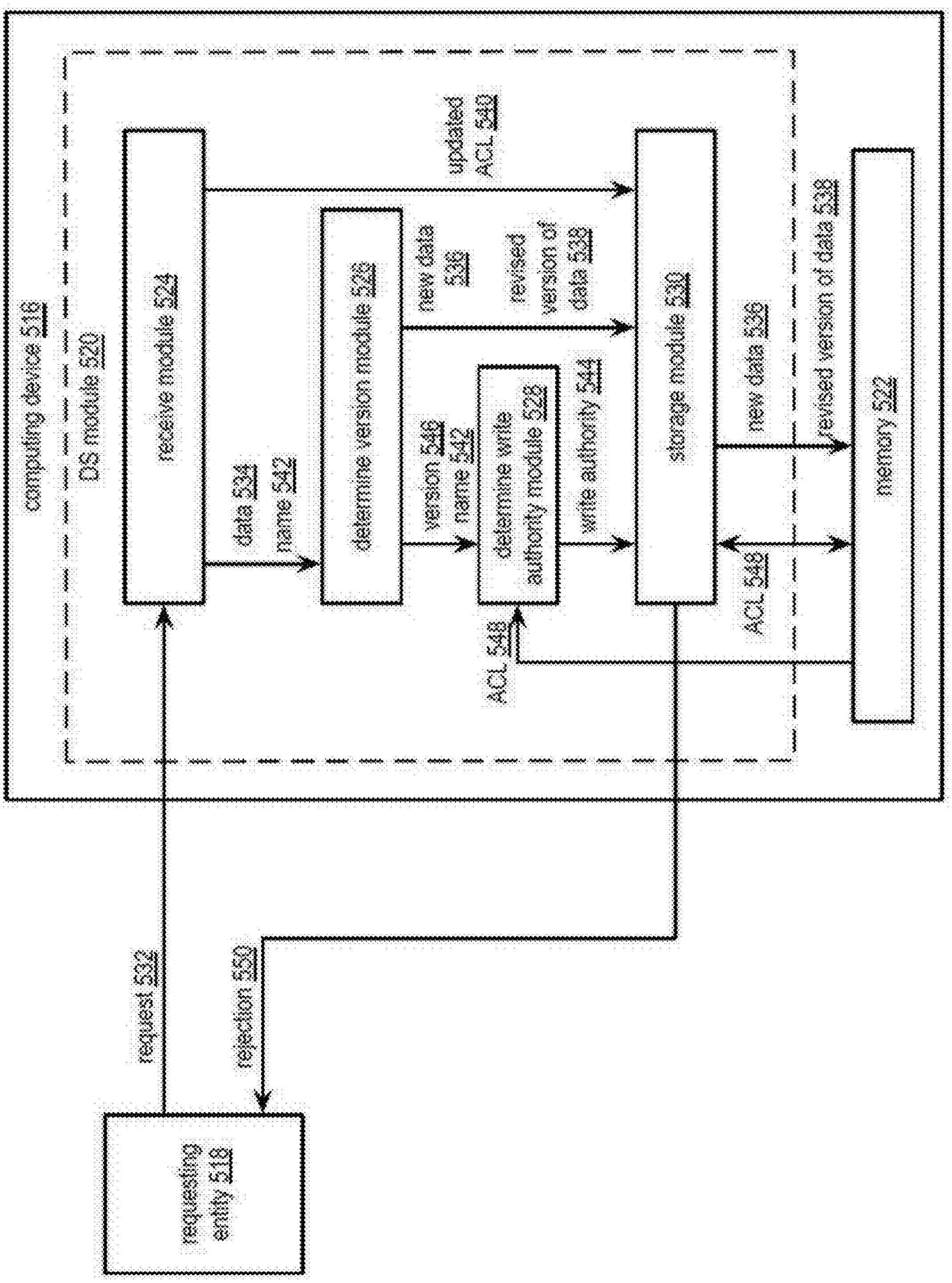
FIG. 17 is a schematic block diagram of an example of a storage unit in accordance with the present disclosure.

FIG. 17 is a schematic block diagram of an example of a storage unit that includes a computing device 516. The storage unit may be implemented utilizing at least one of a storage unit, a storage server, a memory unit, a user device, a computer, a computing array, a distributed computing computer, a dispersed storage (DS) unit, and a distributed storage and task (DST) execution unit. The computing device 516 includes a dispersed storage module 520 and a memory 522. The memory may include one or more of read-only memory and random access memory. The memory may be implemented utilizing one or more memory devices. Each memory device of the one or more memory devices may be implemented utilizing one or more of solid-state memory, optical disc memory, and a magnetic disk memory. The DS module 520 includes a receive module 524, a determine version module 526, a determine write authority module 528, and a storage module 530.

The storage unit functions to receive a write request 532 for storing a data object 534, determine whether the data object 534 is a new data object 536 or a revised version 538 of an existing data object, determine a write authority 544, and process the write request 532 for storing the data object 534 in accordance with the write authority 544. The data object 534 may include an encoded data slice of a set of encoded data slices, where a data segment is encoded using a dispersed storage error encoding function to produce the set of encoded data slices.

With regards to receiving the write request 532 for storing the data object 534, the receive module 524 receives, from a requesting entity 518 (e.g., a DS processing unit, another storage unit associated with the storage unit), the write request 532 for storing the data object 534, where the write request includes updated access control list (ACL) information 540 regarding the data object 534 and a name 542 identifying the data object 534. The write request may further include one or more of an identifier of the requesting entity 518 and a signed certificate.

With regards to determining whether the data object 534 is the new data object 536 or the revised version 538 of the existing data object, the determine version module 526 determines whether the data object 534 is the new data object 536 or the revised version 538 of the existing data object. The determine version module 526 determines whether the data object 534 is the new data object 536 or the revised version 538 of the existing data object by interpreting a revision number field of the name 542. The determine version number 526 may output a version 546 to indicate whether the data object 534 is the new data object 536 or the revised version 538 of the existing data object. For example, the determine version module 526 outputs the version 546 to indicate that the data object 534 is the new data object 536 when the revision number field indicates a first revision number.

With regards to determining the write authority 544, the determine write authority module 528 determines the write authority 544 of the requesting entity 518 based on information contained in a locally stored ACL 548 (e.g., permissions retrieved from the memory 522 with regards to which types of requests the identity of the requesting entity 518 is allowed to perform), where the write authority 544 includes, at least one of, authorization to issue a write request for the new data object 536, authorization to issue a write request for the revised version 538 of the existing data object, and authorization to issue updated ACL information 540 regarding the new data object 536 or the revised version 538 of the existing data object.

The write authority 544 may further include a range of permissible revisions for the revised version 538 of the existing data object. For example, the requesting entity 518 is authorized to store revised versions 538 within a range of revisions 1-10 and update the ACL information 548 for the same range. The determine write authority module 528 may further determine the write authority 544 to include an indicator that indicates whether a revision number of the revised version 538 of the existing data object is within the range of permissible revisions.

When the write request 532 is regarding the new data object 536 (e.g., as indicated by version 546), the determine write authority module 528 may further determine that the requesting entity is authorized to issue the write request for the new data object 536 and to issue the updated ACL information 540 regarding the new data object 536. The determine write authority module 528 determines that the requesting entity 518 is authorized to issue the write request 532 for the new data object 536 and to issue the updated ACL information 540 regarding the new data object 536 by extracting the signed certificate from the write request 532 and verifying the signed certificate to establish authorization (e.g., generate the write authority 544) to issue the write request 532 for the new data object 536 and to issue the updated ACL information 540 regarding the new data object 536. The write authority generates the write authority 544 to include an indicator that indicates that the requesting entity is authorized to issue the write request for the new data object 536 and to issue the updated ACL information 540 regarding the new data object 536 when the determine write authority module 528 determines that the requesting entity is authorized to issue the write request for the new data object 536 and to issue the updated ACL information 540 regarding the new data object 536.

With regards to processing the write request 532 for storing the data object 534 in accordance with the write authority 544, when the write request 532 is regarding the revised version 538 of the existing data object and the write authority 544 includes the authority to issue the write request for the revised version 538 of the existing data object and authorization to issue updated ACL information regarding the revised version of the existing data object, the storage module 530 stores the revised version 538 of the existing data object in the memory 522 and updates the access control list 548 in the memory 522 based on the updated ACL information 540. The updating includes at least one of appending and replacing. When the write request 532 is regarding the revised version 538 of the existing data object and the write authority 544 does not include the authority to issue the write request for the revised version of the existing data object, the storage module 530 sends the write request rejection message 550 to the requesting entity 518.

When the revision number is within the range of permissible revisions, as indicated by the write authority 544, the storage module 530 stores the revised version 538 of the existing data object in the memory 522 and updates the access control list 548 in the memory 522 based on the updated ACL information 540. When the revision number is not within the range of permissible revisions, the storage module 530 denies the write request (e.g., no storage, issue an error message, output a write request rejection message 550 to the requesting entity 518).

When the write request 532 is regarding the new data object 536 and when the write authority 544 indicates that that the requesting entity 518 is authorized to issue the write request 532 for the new data object 536 and to issue the updated ACL information 540 regarding the new data object 536, the storage module 530 stores the new data object 536 in the memory 522 and updates the access control list 548 in the memory 522 based on the updated ACL information 540 regarding the new data object 536.

When the write request 532 is regarding the revised version 538 of the existing data object and the write authority 544 includes the authority to issue the write request for the revised version 538 of the existing data object but not the authorization to issue updated ACL information 540 regarding the revised version 538 of the existing data object, the storage module 530 stores the revised version 538 of the existing data object in the memory 522 and accesses a trusted source (e.g., a managing unit, a security server, another storage unit, a DS processing unit, etc.). The accessing is with regards to authenticating the requesting entity's authority to issue the updated ACL information 540 regarding the revised version 538 of the existing data object or obtaining the updated ACL information 540 regarding the revised version 538 of the existing data object. The storage module 530 updates the ACL information 548 in the memory 522 using the updated ACL information 540 when the accessing the trusted source indicates that the requesting entity has authority to issue the updated ACL information 540. Alternatively, the storage module 530 updates the ACL information 548 in the memory 522 using updated ACL information 540 obtained from the trusted source when obtaining the updated ACL information 540 from the trusted source.

Figure 18:
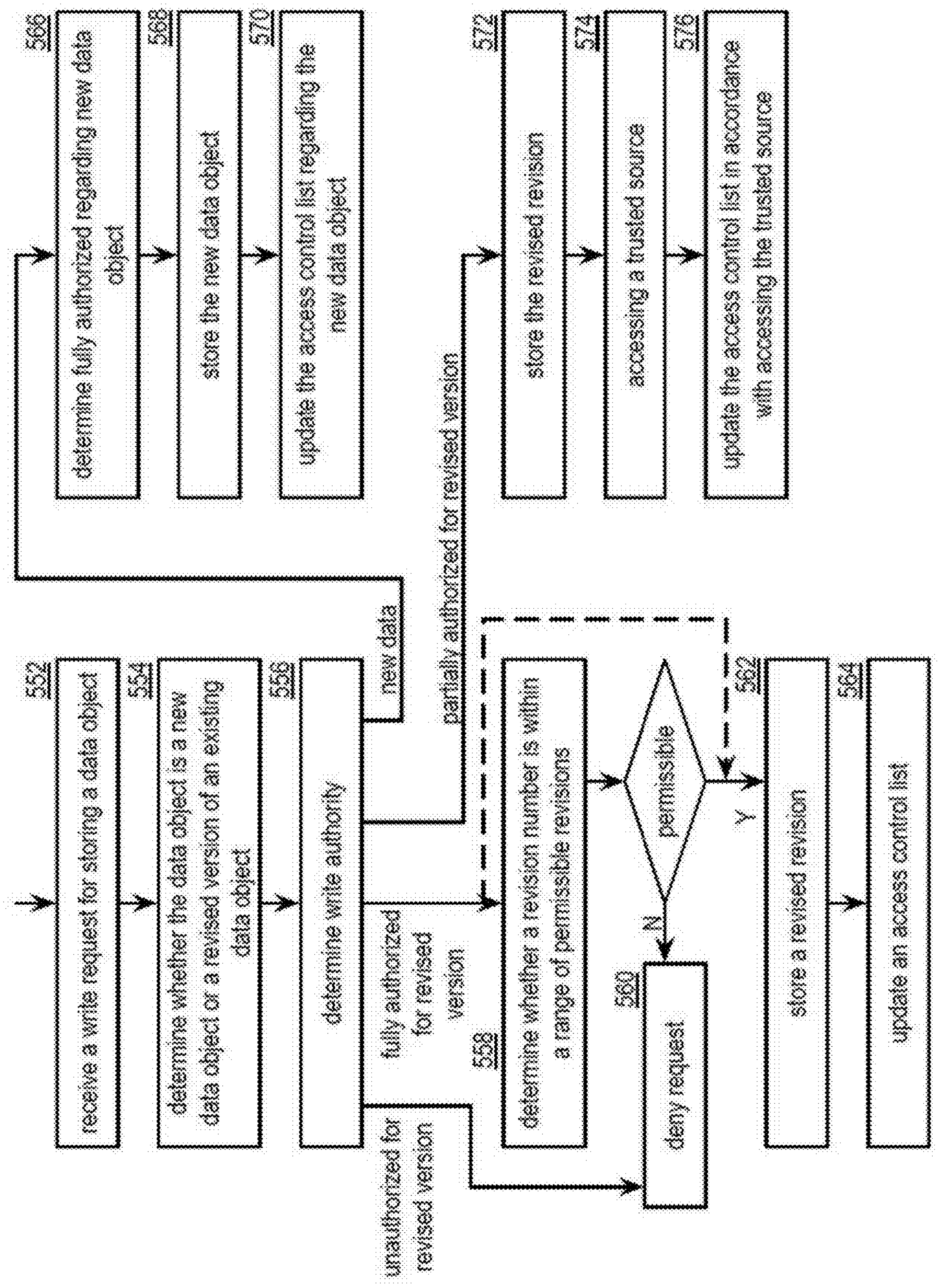
FIG. 18 is a flow diagram illustrating an example of storing a slice in accordance with the present disclosure.

FIG. 18 is a flow diagram illustrating an example of storing a slice. The method begins at step 552 where a processing module (e.g., of a storage unit) receives, from a requesting entity, a write request for storing a data object, where the write request includes updated access control list (ACL) information regarding the data object and a name identifying the data object. The data object includes an encoded data slice of a set of encoded data slices, where a data segment is encoded using a dispersed storage error encoding function to produce the set of encoded data slices. The method continues at step 554 where the processing module determines whether the data object is a new data object or a revised version of an existing data object. The determining whether the data object is the new data object or the revised version of the existing data object includes interpreting a revision number field of the name.

The method continues at step 556 where the processing module determines write authority of the requesting entity based on information contained in a locally stored access control list. The write authority includes at least one of authorization to issue a write request for the new data object, authorization to issue a write request for the revised version of the existing data object, and authorization to issue updated ACL information regarding the new data object or the revised version of the existing data object. The write authority may include a range of permissible revisions for the revised version of the existing data object.

When the write request is regarding the revised version of the existing data object and the write authority includes the authority to issue the write request for the revised version of the existing data object and authorization to issue updated ACL information regarding the revised version of the existing data object, the method continues at step 558 where the processing module determines whether a revision number of the revised version of the existing data object is within the range of permissible revisions. Alternatively, when not checking a revision number, the method branches to step 562. When the revision number is within the range of permissible revisions, the method branches to step 562. When the revision number is not within the range of permissible revisions, the method continues to step 560. When the revision number is not within the range of permissible revisions, the method continues at step 560 where the processing module denies the write request. The denying of the write request includes sending a write request rejection message to the requesting entity to deny the request. When the write request is regarding the revised version of the existing data object and the write authority does not include the authority to issue the write request for the revised version of the existing data object, the method continues at step 560 to deny the request.

When the revision number is within the range of permissible revisions, the method continues at step 562 where the processing module stores the revised version of the existing data object (e.g., in a local memory). The method continues at step 564 where the processing module updates an access control list based on the updated ACL information (e.g., overwrites the access control list with the updated ACL information in the local memory).

When the write request is regarding the new data object, the method continues at step 566 where the processing module determines that the requesting entity is authorized to issue the write request for the new data object and to issue the updated ACL information regarding the new data object. The determining that the requesting entity is authorized to issue the write request for the new data object and to issue the updated ACL information regarding the new data object includes extracting a signed certificate from the write request and verifying the signed certificate to establish authorization to issue the write request for the new data object and to issue the updated ACL information regarding the new data object. When fully authorized, the method continues at step 568 where the processing module stores the new data object. The method continues at step 570 where the processing module updates the access control list based on the updated ACL information regarding the new data object.

When the write request is regarding the revised version of the existing data object and the write authority includes the authority to issue the write request for the revised version of the existing data object but not the authorization to issue updated ACL information regarding the revised version of the existing data object, the method continues at step 572 where the processing module stores the revised version of the existing data object. The method continues at step 574 where the processing module accesses a trusted source regarding authenticating the requesting entity's authority to issue the updated ACL information regarding the revised version of the existing data object or obtaining the updated ACL information regarding the revised version of the existing data object.

The method continues at step 576 where the processing module updates the access control list in accordance with the accessing of the trusted source. For example, the processing module utilizes updated ACL information from the requesting entity to update the access control list when the trusted source indicates that the requesting entity has authority to issue the updated ACL information regarding the revised version of the existing data object. As another example, the processing module utilizes updated ACL information obtained from the trusted source to update the access control list.

Figure 19:
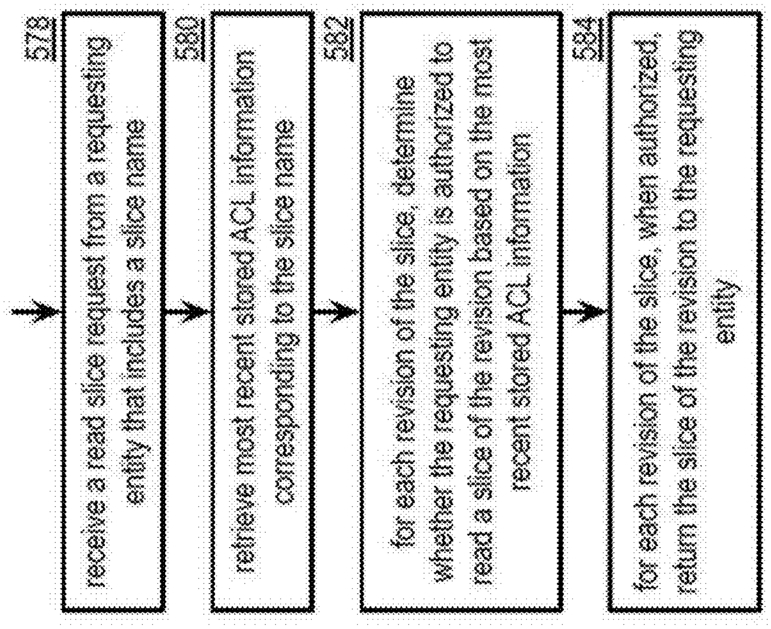
FIG. 19 is a flow diagram illustrating an example of retrieving a slice in accordance with the present disclosure.

FIG. 19 is a flow diagram illustrating an example of retrieving a slice. The method begins at step 578 where a processing module (e.g., of a storage unit) receives a read slice request from a requesting entity that includes a slice name. The method continues at step 580 where the processing module retrieves most recent stored ACL information corresponding to the slice name. For each revision of the slice, the method continues at step 582 where the processing module determines whether the requesting entity is authorized to read a slice of the revision based on the most recent stored ACL information. For example, the processing module verifies access permissions of the requesting entity with the ACL information for the slice revision. For each revision of the slice, when authorized, the method continues at step 584 where the processing module returns the slice of the revision to the requesting entity. The returning includes generating a read slice response that includes or more of the slice, the revision number, and a favorable response indicator. The returning further includes sending the read slice response to the requesting entity.

Figure 20:
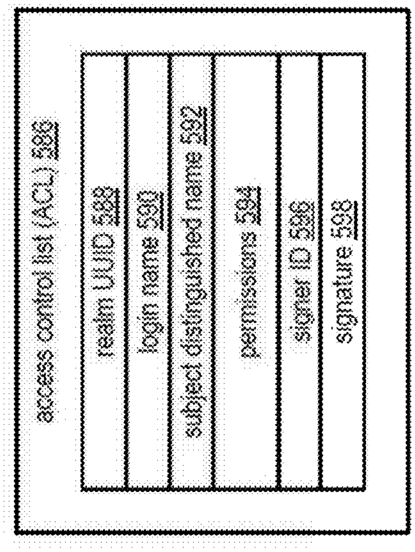
FIG. 20 is a diagram illustrating an example of an access control list (ACL) structure in accordance with the present disclosure.

FIG. 20 is a diagram illustrating an example of an access control list (ACL) structure 586 that includes a realm universally unique identifier (UUID) field 588, a login name field 590, a subject distinguished name field 592, a permissions field 594, a signer identifier (ID) field 596, and a signature field 598. The realm UUID field 588 includes a realm UUID entry of a plurality of realm UUIDs associated with at least one of a distributed storage and task network (DSTN) and a dispersed storage network (DSN). For example, a realm entry includes www.cleversafe.com. The login name field 590 includes a login name entry corresponding to an identifier of an entity associated with permissions of the ACL. The entity includes at least one of a module, a device, a unit, and a user. The subject distinguished name field 592 includes a subject distinguished name entry of a pathname of a directory and/or index uniquely identifying a directory entry. For example, a distinguished name entry includes www.cleversafe.com/DSTN/media/example.jpg. The permissions field 594 includes at least one permissions entry, where the at least one permissions entry identifies allowed operations and un-allowed operations corresponding to the other entries of the ACL 586. For example, a permissions entry identifies an allowed read operation and not allowing a write operation. The signer ID field 596 includes a signer ID entry, where the signer ID entry corresponds to an entity that signs the ACL 586 to produce a signature entry of the signature field 598. The signature field 598 includes the signature entry, where the signature entry includes a signature over the ACL 586 to enable subsequent verification of the ACL 586.

Figure 21:
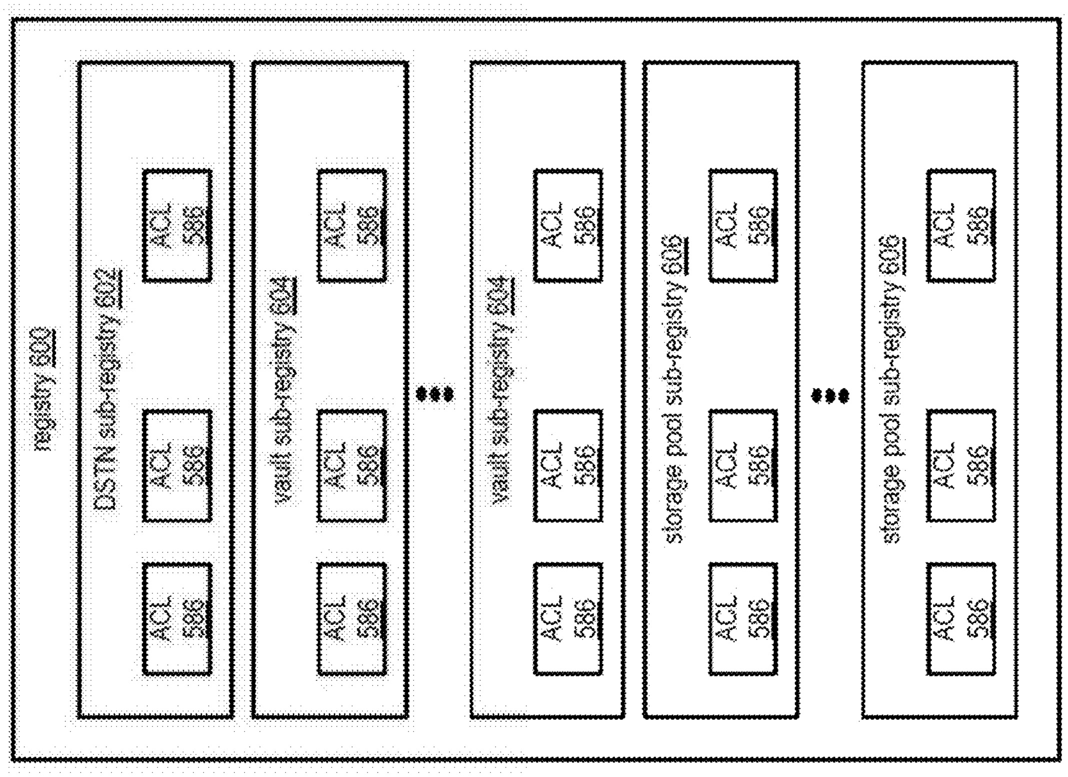
FIG. 21 is a diagram illustrating an example of a registry structure in accordance with the present disclosure.

FIG. 21 is a diagram illustrating an example of a registry structure 600 that includes a distributed storage and task network (DSTN) sub-registry 602, one or more vault sub-registries 604, and one or more storage pool sub-registries 606. The registry structure 600 may correspond to at least one of a DSTN and a dispersed storage network (DSN). Each of the DSTN sub-registry 602, the one or more vault sub-registries 604, and the one or more storage pool sub-registries include one or more access control lists (ACLs) 586. Alternatively, the DSTN sub-registry 602 may correspond to a dispersed storage network (DSN) sub-registry when the registry 600 corresponds to the DSN.

The registry 600 may be utilized to authorize access requests within at least one of the DSTN and the DSN. At least one of the DSTN sub-registry 602, the one or more vault sub-registries 604, and the one or more storage pool sub-registries 606 may be utilized when authorizing a DSTN access request based on one or more of a requesting entity identifier (ID) associated with the DSTN access request and an access type of the DSTN access request. Utilizing the registry 600 includes identifying the registry 600 and utilizing at least one ACL 586 of the registry 600 to authorize the DSTN access request. For example, the DSTN sub-registry 600 to is identified to authorize a DSTN level access request. The DSTN level access request includes at least one of a create vault request, a delete vault request, a create storage pool request, a delete storage pool request, a create realm request, and a delete realm request. Utilizing the at least one ACL 586 includes identifying the at least one ACL 586 based on the requesting entity ID, retrieving the at least one ACL 586, and determining whether the DSTN access request is authorized based on one or more permissions of the ACL 586. As another example, the vault sub-registry 604 is identified to authorize a vault level access request. The vault level access request includes at least one of a delete object request, an add object request, a modify object request, and a modify permissions request. As another example, the storage pool sub-registry 606 is identified to authorize a storage pool level access request. The storage pool level access request includes a modify storage pool request. Methods of generating and utilizing the registry 600 are discussed in greater detail with reference to FIG. 22 and FIG. 23.

Figure 22:
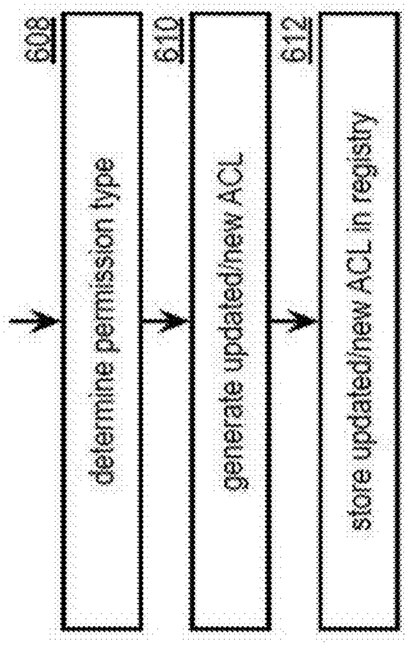
FIG. 22 is a flow diagram illustrating an example of generating an access control list (ACL) in accordance with the present disclosure.

FIG. 22 is a flow diagram illustrating an example of generating an access control list (ACL). The method begins at step 608 where a processing module (e.g., of a distributed storage and task (DST) client module) determines a permissions type based on at least one of a request, a predetermination, and a requesting entity. The method continues at step 610 where the processing module generates an updated and/or new ACL. The generating includes generating a realm universally unique identifier (UUID) entry for a realm UUID field, generating a login name entry for a login name field that includes an identifier of the entity of the ACL, generating a subject distinguished name entry of a subject distinguished name field corresponding to an object stored in a distributed storage and task network (DSTN), generating permissions for the permissions type based on a permissions authorization input (e.g., an authorized activity, an un-authorized activity), generating a signer identifier (ID) entry for a signer ID field corresponding to the processing module, and generating a signature entry for a signature field, where the signature is generated over the ACL utilizing a private key associated with the processing module. The method continues at step 612 where the processing module stores the updated and/or new ACL in a registry. The storing includes identifying a sub-registry of the registry based on the permissions type. For example, the processing module identifies a vault sub-registry when the permissions type is with regards to modifying data stored as encoded data slices in the DSTN.

Figure 23:
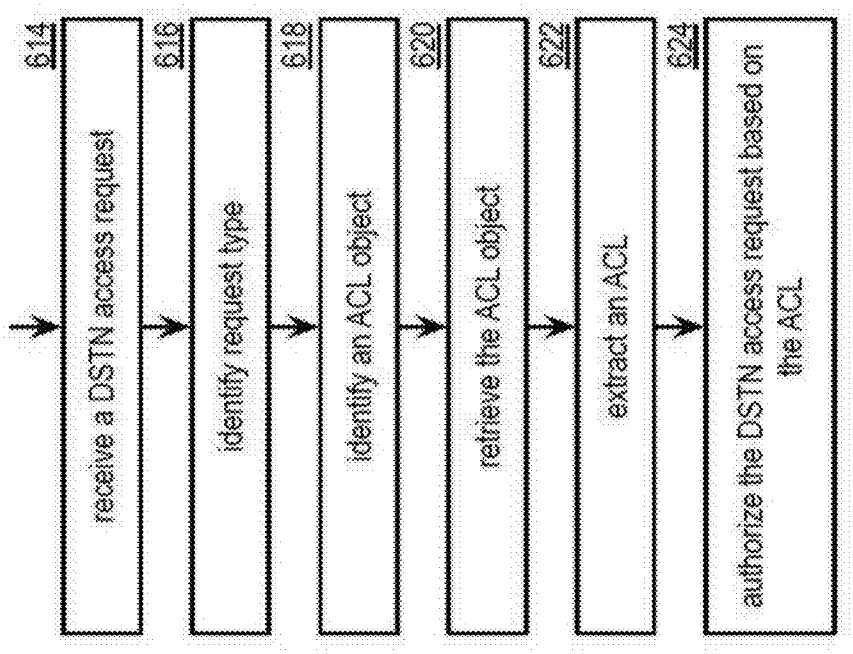
FIG. 23 is a flow diagram illustrating an example of utilizing an access control list (ACL) in accordance with the present disclosure.

FIG. 23 is a flow diagram illustrating an example of utilizing an access control list (ACL). The method begins at step 614 where a processing module (e.g., of a distributed storage and task (DST) client module) receives a distributed storage and task network (DSTN) access request from a requesting entity. The method continues at step 616 where the processing module identifies a request type of the DSTN access request (e.g., extracting a type field). The method continues at step 618 where the processing module identifies an ACL object based on the request type. For example, the processing module identifies an ACL object associated with the requesting entity within a sub registry associated with the request type.

The method continues at step 620 where the processing module retrieves the ACL object. The retrieving includes generating at least a set of read slice requests that includes at least a set of slice names corresponding to the ACL object, outputting the at least the set of read slice requests to the DSTN, retrieving at least a decode threshold number of read slice responses that includes at least a decode threshold number of encoded data slices corresponding to the ACL object, and decoding the at least the decode threshold number of encoded data slices to produce the ACL object.

The method continues at step 622 where the processing module extracts an ACL of one or more ACLs associated with the ACL object. The extracting includes identifying the ACL of the one of more ACLs based on a requesting unit identifier. The method continues at step 624 where the processing module authorizes the DSTN access request based on the ACL. The authorization includes comparing the DSTN access request to permissions of the ACL to determine whether the DSTN access request is authorized.

Figure 24:
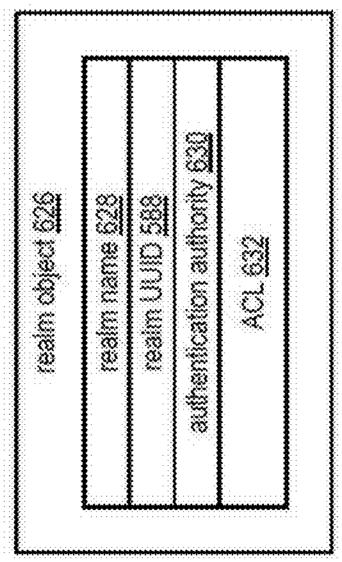
FIG. 24 is a diagram illustrating an example of a realm object structure in accordance with the present disclosure.

FIG. 24 is a diagram illustrating an example of a realm object structure 626 that includes a realm name field 628, a realm universally unique identifier (UUID) field 588, an authentication authority field 630, and an access control list (ACL) field 632. The realm name field 628 includes a realm name entry, where the realm name entry includes an alphanumeric name associated with an entry of the realm UUID field 588. For example, a realm name entry of "Cleversafe" refers to a realm of one or more realms associated with at least one of a distributed storage and task network (DSTN) and a dispersed storage network (DSN). The realm UUID field 588 includes a realm UUID entry associated with the realm. The authentication authority field 630 includes an authentication authority entry, where the authentication authority entry includes one or more of an authentication protocol, a location of an authority (e.g., a certificate authority), a name of the authority, and an internet protocol (IP) address of the authority. The ACL field 632 includes at least one ACL entry, where the at least one ACL entry includes an access control list associated with the realm.

Figure 25:
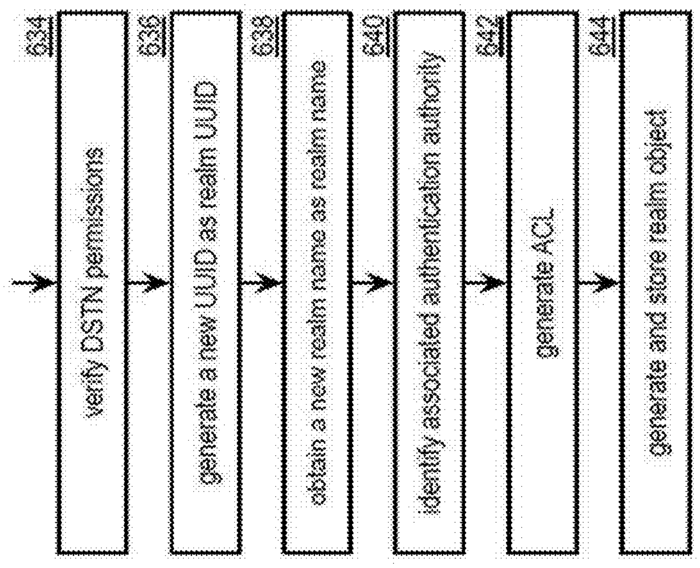
FIG. 25 is a flow diagram illustrating an example of generating a realm object in accordance with the present disclosure.

FIG. 25 is a flow diagram illustrating an example of generating a realm object. The method begins at step 634 where a processing module (e.g., of a distributed storage and task (DST) client module) verifies distributed storage and task network (DSTN) permissions. The verifying includes verifying that a requesting entity creating the realm object has DSTN level permissions. For example, the processing module accesses a DSTN level sub-registry to retrieve an access control list (ACL) associated with the requesting entity and verifies that the requesting entity has the DSTN level permissions based on permissions of the ACL.

The method continues at step 636 where the processing module generates a new universally unique identifier (UUID) as a realm UUID entry. The generating may include one or more of generating a random UUID and verifying that UUID has not been used previously (e.g., checking a UUID tombstone list). The method continues at step 638 where the processing module obtains a new realm name as a realm name entry. The obtaining includes at least one of receiving the new realm name, requesting the new realm name, and generating the new realm name as a random name. The method continues at step 640 where the processing module identifies an associated authentication authority as an authentication authority entry. The identifying includes at least one of accessing a certificate authority list, receiving a certificate authority chain, and initiating a query. The method continues at step 642 where the processing module generates an ACL entry to include one or more of the realm UUID entry, a login name, a subject distinguished name, permissions, a signer identifier, and a signature. The login name may include at least one of an identifier associated with an entity of a distributed storage and task network (DSTN) and an anonymous identifier (e.g., wildcard).

The method continues at step 644 where the processing module generates and stores a realm object. The generating includes generating the realm object to include the realm name entry, the realm UUID entry, the authentication authority entry, and the ACL entry. The storing includes encoding the realm object utilizing a dispersed storage error coding function to produce at least one set of encoded data slices and sending the at least one set of encoded data slices to at least one of a distributed storage and task network (DSTN) module and a dispersed storage network memory for storage therein.

Figure 26:
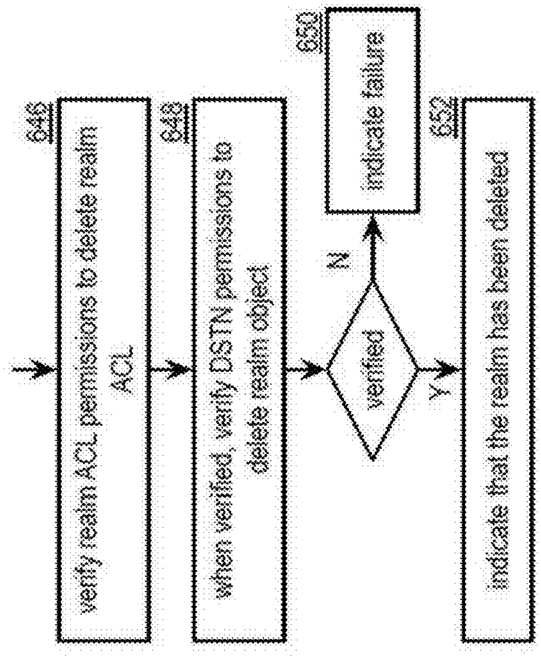
FIG. 26 is a flow diagram illustrating an example of deleting a realm object in accordance with the present disclosure.

FIG. 26 is a flow diagram illustrating an example of deleting a realm object. The method begins at step 646 where a processing module (e.g., of a distributed storage and task (DST) client module) verifies realm access control list (ACL) permissions to delete a realm ACL. The verifying includes accessing a realm sub-registry ACL to verify that a requesting entity deleting the realm object has sufficient permissions to delete the realm ACL of the realm object. When verified, the method continues at step 648 where the processing module verifies distributed storage and task network (DSTN) permissions to delete the entire realm object. The verifying includes accessing a DSTN level sub-registry ACL to verify that the requesting entity deleting the realm object has sufficient permissions to delete the entire realm object. The method branches to step 652 when the processing module verifies the DSTN permissions to delete the realm object. The method continues to step 650 when the processing module does not verify the DSTN permissions to delete the realm object. The method continues at step 650 where the processing module indicates failure. The indicating includes generating an indication of failure and outputting indication of failure to at least one of the requesting entity and a DSTN managing unit.

The method continues at step 652 where the processing module indicates that the realm has been deleted when the processing module verifies DSTN permissions to delete the realm object. The indicating includes at least one of marking the realm object as deleted in at least one of a list and the realm object, deleting the realm object (e.g., generating and sending delete slice requests to a DSTN module), and indicating a tombstone status associated with a realm UUID such that the UUID is not reused.

The methods described above in conjunction with the computing device 16 and the storage units 36 can alternatively be performed by other modules of the distributed storage network or by other devices (e.g., managing unit 18). For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the distributed storage network (DSN), cause the one or more computing devices and/or the storage units to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be or may further include memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a storage network, the method comprising:

maintaining a storage network access control list (ACL) registry, the ACL registry including a storage network sub-registry and one or more vault sub-registries, wherein each of the sub-registries includes one or more ACLs;

receiving a storage network access request from a requesting entity;

identifying a request type of the storage network access request;

identifying the one or more ACLs of a sub-registry associated with the request type;

retrieving the one or more ACLs;

identifying an ACL, of the one or more ACLs, based on an identifier associated with the requesting entity;

comparing the storage network access request to permissions of the identified ACL;

determining, based on the permissions, that the storage network access request is authorized; and processing the storage network access request that is authorized.

2. The method of claim 1, wherein the storage network sub-registry includes information for authorizing storage network access requests for one or more of:

creating a vault;

deleting a vault;

creating a storage pool;

deleting a storage pool;

creating a realm; or deleting a realm.

3. The method of claim 1, wherein a vault sub-registry of the one or more vault sub-registries includes information for authorizing vault level access requests for one or more of:

a delete object request;

an add object request;

a modify object request; or a modify permissions request.

4. The method of claim 1, wherein the ACL registry further includes one or more storage pool sub-registries, wherein each of the one or more storage pool sub-registries includes one or more ACLs.

5. The method of claim 4, wherein a storage pool sub-registry of the one or more storage pool sub-registries includes information for authorizing storage pool level access requests for modifying a storage pool.

6. The method of claim 1, wherein retrieving the one or more ACLs includes:

retrieving at least a decode threshold number of encoded data slices corresponding to the one or more ACLs; and decoding the at least a decode threshold number of encoded data slices to produce the one or more ACLs.

7. The method of claim 1, wherein maintaining the storage network ACL registry includes:

receiving a write request for storing a new data object;

determining a write authority of the requesting entity based on information contained in an ACL;

determining that the requesting entity is authorized to issue the write request for the new data object based on the write authority of the requesting entity; and updating a vault sub-registry of the one or more vault sub-registries with updated ACL information regarding the new data object.

8. The method of claim 7, wherein determining that the requesting entity is authorized to issue the write request for the new data object includes extracting a signed certificate from the write request and verifying the signed certificate to establish authorization to issue the write request for the new data object and to update the vault sub-registry with updated ACL information regarding the new data object.

9. The method of claim 1, wherein an ACL includes one or more of:

a realm universally unique identifier field;

a login name field;

a subject distinguished name field;

a permissions field;

a signer identification field; or a signature field.

10. A computing device, comprising:

at least one interface;

memory that stores operational instructions; and a processing module operably coupled to the memory, wherein the processing module is configured to execute the operational instructions to:

maintain a storage network access control list (ACL) registry, the ACL registry including a storage network sub-registry and one or more vault sub-registries, wherein each of the sub-registries includes one or more ACLs;

receive, via the at least one interface, a storage network access request from a requesting entity;

identify a request type of the storage network access request;

identify the one or more ACLs of a sub-registry associated with the request type;

retrieve, via the at least one interface, the one or more ACLs;

compare the storage network access request to permissions of the identified ACL;

determine based on the permissions, that the storage network access request is authorized; and processing the storage network access request that is authorized.

11. The computing device of claim 10, wherein the storage network sub-registry includes information for authorizing storage network access requests for one or more of:

creating a vault;

deleting a vault;

creating a storage pool;

deleting a storage pool;

creating a realm; or deleting a realm.

12. The computing device of claim 10, wherein a vault sub-registry of the one or more vault sub-registries includes information for authorizing vault level access requests for one or more of:

a delete object request;

an add object request;

a modify object request; or a modify permissions request.

13. The computing device of claim 10, wherein the ACL registry further includes one or more storage pool sub-registries, wherein each of the one or more storage pool sub-registries includes one or more ACLs.

14. The computing device of claim 13, wherein a storage pool sub-registry of the one or more storage pool sub-registries includes information for authorizing storage pool level access requests for modifying a storage pool.

15. The computing device of claim 10, wherein retrieving the one or more ACLs includes:

retrieving, via the at least one interface, at least a decode threshold number of encoded data slices corresponding to the one or more ACLs; and decoding the at least a decode threshold number of encoded data slices to produce the one or more ACLs.

16. The computing device of claim 10, wherein the processing module is configured to execute the operational instructions to maintain the storage network ACL registry by:

receiving, via the at least one interface, a write request for storing a new data object;

determining a write authority of the requesting entity based on information contained in an ACL;

determining that the requesting entity is authorized to issue the write request for the new data object based on the write authority of the requesting entity; and updating a vault sub-registry of the one or more vault sub-registries with updated ACL information regarding the new data object.

17. The computing device of claim 16, wherein determining that the requesting entity is authorized to issue the write request for the new data object includes extracting a signed certificate from the write request and verifying the signed certificate to establish authorization to issue the write request for the new data object and to update the vault sub-registry with updated ACL information regarding the new data object.

18. The computing device of claim 10, wherein an ACL includes one or more of:

a realm universally unique identifier field;

a login name field;

a subject distinguished name field;

a permissions field;

a signer identification field; or a signature field.

19. A non-transitory computer readable storage medium, comprising:

at least one memory section that stores operational instructions that, when executed by one or more processing modules of a computing device of a storage network, cause the computing device to:

maintain a storage network access control list (ACL) registry, the ACL registry including a storage network sub-registry and one or more vault sub-registries, wherein each of the sub-registries includes one or more ACLs;

receive a storage network access request from a requesting entity;

identify a request type of the storage network access request;

identify the one or more ACLs of a sub-registry associated with the request type;

retrieve the one or more ACLs;

compare the storage network access request to permissions of the identified ACL;

determine based on the permissions, that the storage network access request is authorized; and processing the storage network access request that is authorized.

20. The non-transitory computer readable storage medium of claim 19, wherein the storage network sub-registry includes information for authorizing storage network access requests for one or more of:

creating a vault;

deleting a vault;

creating a storage pool;

deleting a storage pool;

creating a realm; or deleting a realm.

* * * * *